United States Patent
Lockhart, III et al.

(10) Patent No.: US 11,630,918 B2
(45) Date of Patent: *Apr. 18, 2023

(54) SYSTEMS AND METHODS OF DETERMINING COMPROMISED IDENTITY INFORMATION

(71) Applicant: Early Warning Services, LLC, Scottsdale, AZ (US)

(72) Inventors: Lester Leland Lockhart, III, Austin, TX (US); David Hugh Munson, Waterville, ME (US); Gregor R. Bonin, Austin, TX (US); Michael Cook, Wimberley, TX (US)

(73) Assignee: Early Warning Services, LLC, Scottsdale, AZ (US)

( * ) Notice: Subject to any disclaimer, the term of this patent is extended or adjusted under 35 U.S.C. 154(b) by 617 days.

This patent is subject to a terminal disclaimer.

(21) Appl. No.: 16/563,341

(22) Filed: Sep. 6, 2019

(65) Prior Publication Data

US 2020/0004989 A1 Jan. 2, 2020

Related U.S. Application Data

(63) Continuation-in-part of application No. 16/267,297, filed on Feb. 4, 2019, now Pat. No. 10,599,872, which is a continuation of application No. 15/237,519, filed on Aug. 15, 2016, now Pat. No. 10,268,840, which is a continuation-in-part of application No. 14/960,288, filed on Dec. 4, 2015, now abandoned.

(51) Int. Cl.
*G06F 21/62* (2013.01)

(52) U.S. Cl.
CPC .............................. *G06F 21/6263* (2013.01)

(58) Field of Classification Search
CPC .................................................. G06F 21/6263
See application file for complete search history.

(56) References Cited

U.S. PATENT DOCUMENTS

| | | |
|---|---|---|
| 7,240,363 B1 | 7/2007 | Ellingson |
| 7,617,393 B2 | 11/2009 | Betz et al. |
| 7,676,834 B2 | 3/2010 | Camaisa et al. |
| 7,870,608 B2 | 1/2011 | Shraim et al. |

(Continued)

OTHER PUBLICATIONS

Non-Final Office Action dated Dec. 11, 2019 in U.S. Appl. No. 14/960,288, 17 pages.

(Continued)

*Primary Examiner* — Beemnet W Dada
(74) *Attorney, Agent, or Firm* — Kilpatrick Townsend & Stockton LLP

(57) ABSTRACT

A compromised data exchange system extracts data from websites using a crawler, detects portions within the extracted data that resemble personally identifying information (PII) data based on PII data patterns using a risk assessment module, and compares a detected portion to data within a database of disassociated compromised PII data to determine a match using the risk assessment module. A risk score may be assigned to a data item within the database in response to determining the match. In some embodiments, URL data may also be detected in the extracted data. The detected URL data represents further web sites that can be automatically crawled by the system to detect further PII data.

20 Claims, 14 Drawing Sheets

(56) References Cited

U.S. PATENT DOCUMENTS

| | | | |
|---|---|---|---|
| 7,913,302 B2 | 3/2011 | Shraim et al. | |
| 7,962,962 B2 | 6/2011 | Adler et al. | |
| 8,019,689 B1* | 9/2011 | Nachenberg | G06Q 20/027 |
| | | | 705/79 |
| 8,285,656 B1 | 10/2012 | Chang et al. | |
| 8,359,651 B1 | 1/2013 | Wu et al. | |
| 8,429,545 B2 | 4/2013 | Dixon et al. | |
| 8,561,185 B1 | 10/2013 | Muthusrinivasan et al. | |
| 8,566,726 B2 | 10/2013 | Dixon et al. | |
| 8,683,031 B2 | 3/2014 | Green et al. | |
| 8,713,450 B2 | 4/2014 | Garbow et al. | |
| 8,752,181 B2 | 6/2014 | Grzymala-Busse et al. | |
| 8,875,284 B1 | 10/2014 | Newstadt et al. | |
| 8,898,086 B2 | 11/2014 | Downing et al. | |
| 9,172,706 B2 | 10/2015 | Krishnamurthy et al. | |
| 9,203,648 B2 | 12/2015 | Shraim et al. | |
| 9,392,008 B1 | 7/2016 | Michel et al. | |
| 9,449,178 B2 | 9/2016 | Prem et al. | |
| 2008/0147554 A1* | 6/2008 | Stevens | G16H 10/60 |
| | | | 705/51 |
| 2010/0293090 A1 | 11/2010 | Domenikos et al. | |
| 2013/0238600 A1* | 9/2013 | Kindler | G06F 16/9024 |
| | | | 707/722 |
| 2014/0250526 A1* | 9/2014 | Khanna | G06F 21/60 |
| | | | 726/22 |
| 2015/0088756 A1 | 3/2015 | Makhotin et al. | |
| 2015/0134971 A1 | 5/2015 | Park et al. | |
| 2016/0012561 A1* | 1/2016 | Lappenbusch | G06F 16/248 |
| | | | 705/325 |
| 2016/0044054 A1* | 2/2016 | Stiansen | H04L 63/1416 |
| | | | 726/24 |

OTHER PUBLICATIONS

Romanosky et al., Do Data Breach Disclosure Laws Reduce Identity Theft?, Seventh Workshop on the Economics of Information Security, Dartmouth College, Hanover, NH, Jun. 25-28, 2008, 20 pages.

Non-Final Office action dated May 30, 2019 in U.S. Appl. No. 14/960,288, all pages.

* cited by examiner

BUY & SELL FULLZ AT THIS SITE

I HAVE THESE FULLZ AND MANY MORE FOR SALE AT ABC.ONION

|    | NAME       | ADDRESS     | DOB        | DL NUMBER   | SSN         |
|----|------------|-------------|------------|-------------|-------------|
| 1. | XXXXXX,XXX | DENVER, CO  | XX/XX/XXXX | XXX-XX-XXXX | XXX-XX-XXXX |
| 2. | XXXXXX,XXX | PHOENIX, AZ | XX/XX/XXXX | XXX-XX-XXXX | XXX-XX-XXXX |
| 3. | XXXXXX,XXX | AUSTIN, TX  | XX/XX/XXXX | XXX-XX-XXXX | XXX-XX-XXXX |

FULLZ FOR SALE AT 5674.NET. HERE ARE SOME

|    | NAME       | ADDRESS     | DOB        | DL NUMBER   | SSN         |
|----|------------|-------------|------------|-------------|-------------|
| 1. | XXXXXX,XXX | DAYTON, OH  | XX/XX/XXXX | XXX-XX-XXXX | XXX-XX-XXXX |
| 2. | XXXXXX,XXX | OMAHA, NE   | XX/XX/XXXX | XXX-XX-XXXX | XXX-XX-XXXX |
| 3. | XXXXXX,XXX | TOLEDO, OH  | XX/XX/XXXX | XXX-XX-XXXX | XXX-XX-XXXX |
| 4. | XXXXXX,XXX | JACKSON, MS | XX/XX/XXXX | XXX-XX-XXXX | XXX-XX-XXXX |

TRY THESE FULLZ. MANY MORE FOR PURCHASE AT 35FRAUD.NET

|    | NAME       | ADDRESS      | DOB        | DL NUMBER   | SSN         |
|----|------------|--------------|------------|-------------|-------------|
| 1. | XXXXXX,XXX | SAN DIEGO, CA| XX/XX/XXXX | XXX-XX-XXXX | XXX-XX-XXXX |
| 2. | XXXXXX,XXX | NEW YORK, NY | XX/XX/XXXX | XXX-XX-XXXX | XXX-XX-XXXX |
| 3. | XXXXXX,XXX | MIAMI, FL    | XX/XX/XXXX | XXX-XX-XXXX | XXX-XX-XXXX |
| 4. | XXXXXX,XXX | KNOXVILLE, TN| XX/XX/XXXX | XXX-XX-XXXX | XXX-XX-XXXX |

FIG. 13

SYSTEMS AND METHODS OF DETERMINING COMPROMISED IDENTITY INFORMATION

CROSS-REFERENCE TO RELATED APPLICATION(S)

The present disclosure is a continuation-in-part of and claims priority to U.S. application Ser. No. 16/267,297, filed on Feb. 4, 2019 and entitled "Systems and Methods of Determining Compromised Identity Information," which is a continuation of U.S. application Ser. No. 15/237,519, filed on Aug. 15, 2016 and entitled "Systems and Methods of Determining Compromised Identity Information," now U.S. Pat. No. 10,268,840, which is a continuation-in-part of and claims priority to U.S. application Ser. No. 14/960,288, filed on Dec. 4, 2015 and entitled "Compromised Identity Exchange Systems and Methods," the complete disclosures of which are fully incorporated by reference herein for all purposes.

FIELD

The present disclosure is generally related to identification of compromised identity information, and more particularly to system and methods of determining compromised personally identifiable information on the Internet.

BACKGROUND

Personally identifiable information (PII) may be collected by a variety of organizations, including healthcare organizations, governmental organizations, financial entities (e.g., credit card companies, banks, etc.), credit bureaus, educational institutions, and other organizations. PII includes information that can be used to uniquely identify an individual and may include, but is not limited to, the individual's full name, date of birth, social security number, bank or credit card numbers, passwords, addresses, phone numbers, and the like. Such data is increasingly maintained in electronic form, making it easier for such data to become compromised, such as through a hacking event, inadvertent disclosure, or other data breach incidents. Compromised PII data may be used for identify theft and for other nefarious purposes.

In addition to data breach events, PII can be compromised through "phishing," which refers to a process of masquerading as a trustworthy entity in an electronic communication. An example of phishing may include a fraudulent email that appears to be from a valid source, such as, for example, a national bank or a credit card company. The fraudulent email may incorporate a uniform resource locator (URL) that re-directs the user to a fraudulent website that masquerades as a legitimate website for the real company. However, the fraudulent website may be designed to steal PII via a false transaction. For example, the fraudulent website may request "confirmation" of PII, such as, for example, a credit card number or a username and password. The "confirmed" PII may then be stored for later improper use.

Once collected, PII data may be sold on a black market through various web sites and illicit data sources. Such web sites and data sources may not be registered with standard search engines, making them difficult to find through traditional web searches. Such web sites and data sources may be part of the "dark" web, which can be represented by a large number of web servers that do not permit search engine indexing and which host information for those who know where to look.

The legitimate owner or holder of PII (such as a credit card company) may know that data has been compromised, for example, when a credit card number has been used in an attempt to conduct a fraudulent transaction. However, that alone does not necessarily reflect the degree of risk to the affected individual. For example, while a credit card number may have been compromised and used for a single attempted transaction, it may or may not be offered for sale on the dark web. Once a stolen credit card number or other compromised PII is offered for sale on the dark web, the risk associated with the compromised PII greatly increases.

Websites on the dark web that offer PII often present partial or complete samples of actual PII that can be purchased (with an opportunity to negotiate and purchase PII beyond the samples). The samples often appear on "marketplace" websites on the dark web. The marketplace websites typically display not only PII samples and a link or URL for contacting the seller, but also links to other marketplace websites where PII (and other illicit items) may be offered. It is usually impractical (and prohibitively expensive) to negotiate the purchase of PII in order to determine whether specific PII is being offered for sale. One approach in trying to determine whether compromised PII has been offered for sale would be to visit many sites and base the determination on samples of stolen PII offered at those sites, with the hope that if enough sites are visited, there is a reasonable chance of finding at one of those sites compromised PII for a specific individual (if it is being offered for sale).

However, because of the vast number of sites on the dark web, particularly "marketplace" sites that offer PII "samples" and provide links to other websites where further stolen PII may be posted, the process of confirming that compromised PII is being offered for sale can be complex and burdensome, even for crawler or spider applications that can efficiently extract PII data from individual websites.

SUMMARY

In some embodiments, a system may be configured to identify PII data on various web sites based on data patterns. For example, entity names, social security numbers, email addresses, phone numbers, addresses, and other types of information are typically presented in a particular pattern, which pattern can be identified whether or not the information is labeled.

In some embodiments, the system may be configured to search one or more web sites for data patterns that resemble PII data and extract links from pages that include such data patterns. The system may then process the extracted links to extract and process the data to determine whether the data includes PII data. The scraped data may be provided to an Artificial Intelligence (AI) engine for processing against particular rules to verify PII data or may be elevated to an administrator for review. Confirmed PII data may be treated like compromised PII data, and may be disassociated before being added to a database of compromised PII data.

In some embodiments, the system may crawl one or more identified web sites to extract data. The system may process the extracted data, searching the extracted data to identify patterns representing portions of PII data. The scraped data may be provided to an Artificial Intelligence (AI) engine for processing against particular rules to verify PII data or may be elevated to an administrator for review. Confirmed PII data may be treated like compromised PII data, and may be disassociated before being added to a database of compromised PII data.

In certain embodiments, the system may compare the scraped data that resembles PII data to disassociated PII data (corresponding to a breach event) within a database. If a match is determined, the system may elevate a risk score associated with the particular piece of data (or with the breach event if more than one matching piece of PII data is determined).

In some embodiments, a compromised data exchange system may include an interface configured to couple to a network, a processor coupled to the interface, and a memory accessible to the processor. The memory may be configure to store instructions that, when executed, cause the processor to extract data from one or more websites using a crawler, detect portions within the data that resemble personally identifying information (PII) data based on PII data patterns using a risk assessment module, and compare a detected portion to data within a database of disassociated compromised PII data to determine a match using the risk assessment module. The instructions may further cause the processor to selectively assign a risk score to a data item within the database in response to determining the match using a risk scoring module.

As mentioned earlier, some websites have not only PII offered for sale, but also have links to other websites where PII may be offered for sale. Thus, the compromised PII exchange system and method may be configured to not only search (and crawl) an initially identified set of websites based on an list of URLs (e.g., URLs for websites on the dark web) that have been provided to the system, but also automatically search additional websites identified by URLs detected in the initially identified websites. Thus, in some embodiments, the risk assessment module not only detects portions within the extracted data that resemble PII, but also detects URLs (or portions within the extracted data that resemble URLs) that provide links to other websites. The system and method prioritizes the URL data (and the websites identified by URL data) for further searching, by analyzing the extracted data. In some embodiments, this may be done by ranking the initial website at which the URL data was found.

Thus, for example, once a websites identified in the initial list of URLs has been crawled, the extracted data is provided to the risk assessment module to both detect portions of the extracted data that may resemble PII data and detect URLs that identify other websites to be crawled. These other websites are prioritized for being crawled, by ranking the websites where the URL data was found, so that websites (that are more likely to have useful PII data) will be accessed and have data extracted before other websites.

In some embodiments, the system and method ranks websites (for prioritizing URL data to be used for further crawling) based on the number of sets of PII data found at the website where the URL data was detected.

Thus, in some embodiments compromised identity exchange systems and methods include an interface configured to couple to a network, a processor coupled to the interface, a database storing compromised personally identifying information (PII) data, and a memory. The memory is accessible to the processor and stores instructions that, when executed, cause the processor to: extract data from one or more specified (first or initial) websites using a crawler; detect portions within the extracted data from the specified websites that resemble one or more sets of PII data, each set of PII data associated with a compromised entity; detect URLs within the extracted data from the specified websites that identify one or more other (second) websites; determine a priority ranking for each of the other websites based on the number of sets of PII data at each of the identified websites; extract data from the other websites, wherein each of the other websites are accessed to extract data based on its determined priority ranking; detect portions within the extracted data from the other websites that resemble one or more sets of PII data; compare (1) the detected portions within the extracted data, from both the specified websites and the other websites, that resemble one or more sets of PII data, and (2) the compromised PII data stored at the database, to determine a match using the risk assessment module; and selectively assign a risk score to a data item within the database of compromised PII data, in response to determining the match.

BRIEF DESCRIPTION OF THE DRAWINGS

FIG. 13 illustrates a website page on the dark web, where samples of PII offered for sale are displayed.

In the following discussion, the same reference numbers are used in the various embodiments to indicate the same or similar elements.

DETAILED DESCRIPTION OF THE INVENTION

Figure 1:
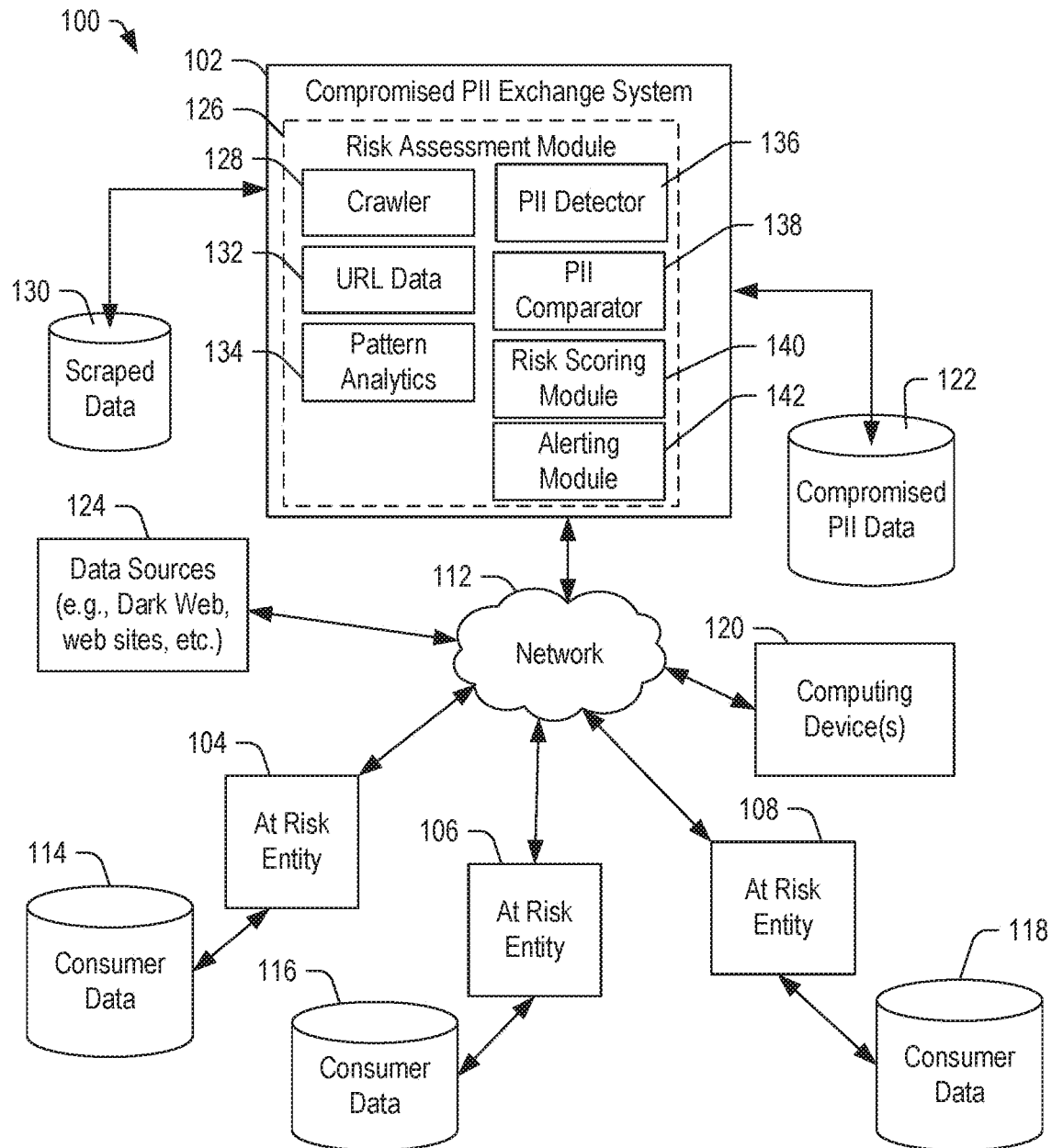
FIG. 1 depicts a block diagram of a compromised identity exchange system, in accordance with certain embodiments of the present disclosure.

In the following detailed description of embodiments, reference is made to the accompanying drawings which form a part hereof, and which are shown by way of illustrations. It is to be understood that features of various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller. In accordance with various embodiments, the methods and functions described herein may be implemented as one or more software programs running on a computing device, such as a tablet computer, smartphone, personal computer, server, or any other computing device. Dedicated hardware implementations including, but not limited to, application specific integrated circuits, programmable logic arrays, and other hardware devices can likewise be constructed to implement the methods and functions described herein. Further, the methods described herein may be implemented as a device, such as a computer readable storage medium or memory device, including instructions that when executed cause a processor to perform the methods.

Conventionally, in response to a breach of a company's data security, a press release may be issued, and affected customers may be notified. Sometimes, new credit cards or new credit card numbers are issued. However, in some instances, compromised data may be used by criminals to open new credit accounts or to attempt to gain access to a customer's account. In some instances, such as when a record keeper's records are compromised, a large amount of customer data, including multiple customer accounts, may be compromised. Data from such data breaches can end up being sold online through websites and private servers.

As used herein, the term "exposed data" or "compromised data" refers to any part of personally identifying information (PII) that may have been compromised or breached, such that an unauthorized individual may have gained access to such information. Further, as used herein, the term "at-risk" refers to an individual or entity that may have PII that may also be in the exposed or compromised data. For the purposes of this disclosure, if PII belonging to a customer of a company (entity) has been exposed, then that company can be considered at-risk. An at-risk entity or at-risk individual may be at risk of losing money or of reputational harm.

Further, an at-risk entity may be in danger of opening new fraudulent accounts based on the exposed data, permitting account takeover of an existing account based on the exposed data, experiencing theft of services based on the exposed data, allowing unauthorized access to further information (such as tax returns) based on the exposed data, and so on. In certain embodiments, the PII data may include names, dates of birth, addresses, social security numbers, driver's license numbers, email addresses, phone numbers, credit card numbers, bank information, other data, or any combination thereof. Such data may be used to identify a particular consumer and which may be misused to attempt to open accounts (such as new services, lines of credit, and so on), gain access to existing accounts, and so on.

Embodiments of compromised identity exchange systems and methods are described below that may be configured to host compromised data or to exchange encrypted data with distributed data sources in order to evaluate risk, to mitigate harm to companies and consumers from such data breaches, or any combination thereof. The compromised identity exchange systems and methods may include capturing compromised data in a disassociated and encrypted form, decrypting the compromised data, and re-encrypting each field of the compromised data using different encryption keys for each field. The re-encrypted compromised data may be hosted by a compromised identity data exchange and personal identifying information (PII) data may be compared to the re-encrypted compromised data to determine a match. Potential risk to a consumer or to an at-risk entity may be determined based on the results of the match. As used herein, the term "disassociated" or "disassociated PII" may refer to PII data elements (identity elements) that have been separated or disconnected from one another by the data originator. In certain embodiments, the disassociated data may be separated or disconnected in such a way that the data elements may not be re-associated to correlate the data to an actual consumer identity by anyone other than the data originator, provided the data originator has the key to map the full identity back together.

In some embodiments, some or all of the compromised data may be hosted by other sources, such as one or more compromised entities. The compromised identity exchange system may receive a query including PII data from one of an at-risk entity or a consumer. The compromised identity exchange system may disassociate and encrypt the PII data from an at-risk entity if the at risk entity did not perform the disassociation and may communicate the encrypted data to one or more of the compromised entities in response to the query. The compromised identity exchange system may receive results from the one or more entities in response to the queries where a match was made to a full PII identity or disassociated identity elements. Each match returned can include information about the data breach, which may consists of the date of the breach, the size/volume of the breach, a code indicating how the data was lost or stolen, among other attributes. In addition to these attributes, attributes associated with the consumer may also be used to measure risk. These attributes might include the number and severity of data breaches a consumer has been involved with, the location of the consumer, the event, if any, that is triggering the risk assessment, among other things. Additionally, participating at-risk entities' reported fraud data will be used to identify fraud rates within every compromised entity's compromised file, as well as attributes will be generated that reflect location of fraud, fraud linkages to email, physical address, phone number or other identity elements. All of these data can be aggregated into risk based results, the aggregated results, or any combination thereof. The compromised identity exchange system may communicate the results, a risk indicator, or any combination thereof to the requester (i.e., the at-risk entity or the consumer).

Additionally, in some embodiments, a risk assessment module may be included within a compromised PII exchange system. The risk assessment module may include a crawler or spider application that can be configured to access a plurality of websites (which may be identified by a list of Uniform Resource Locators (URLs)) to search for patterns of data that resemble PII data, and optionally to scrape data from the sites. The URLs may include an initial list compiled/specified by an operator or administrator. The crawler or spider application may scrape data corresponding to the patterns, or may scrape all data from each website of the plurality of websites and store the data in a database. The risk assessment module may then process the extracted data to identify patterns representing PII data elements. The identified matters may be provided to an administrator for review, to an artificial intelligence (AI) engine for analysis, or both. Once confirmed as PII data, the extracted PII data may be added to a database of compromised PII data.

In some embodiments, the risk assessment module may process extracted data to not only identify PII data elements, but also URLs and links to other websites. The crawler or spider application may further scrape data from those other websites and process it to identify patterns representing not only further PII data elements but also detect further URLs. URLs and their corresponding websites that are identified from the extracted data may be prioritized for crawling, by ranking the websites where the URLs were identified. In one embodiment, the ranking of a URL is based on the number of different sets of PII at the website where the URL was found/identified.

In some embodiments, the risk assessment module may compare the portions of the data that correspond to such patterns to disassociated PII data in a compromised PII database to identify matches. If a single match is found, a risk score associated with the matched data item in the compromised PII database may be increased. If multiple matches are found, the risk assessment module may determine if the multiple matches correspond to a single data breach and, if so, a risk score associated with the particular data breach that is shared by the multiple data items may be increased so that all PII data associated with the particular breach may be flagged as a high risk. Otherwise, the risk scores associated with the matched data may be updated to reflect an increased risk. One possible embodiment of a compromised identity exchange system configured to host compromised PII data and to evaluate risk is described below with respect to FIG. 1.

FIG. 1 depicts a block diagram of a system 100 including a compromised PII exchange system 102, in accordance with certain embodiments of the present disclosure. The compromised PII exchange system 102 may receive personal identifying information (PII) data from one or more compromised (exposed) companies, each of which may have had at least a portion of its customer data compromised through accidental data loss, exposure, theft, or a data breach. The compromised PII exchange system 102 may receive the PII data, preferably in an encrypted and optionally disassociated form, from the compromised companies. The compromised PII exchange system 102 may re-encrypt the PII data and may store the re-encrypted PII data in a database of compromised data 122. In certain embodiments, the re-encrypted PII data may be disassociated, and each field of the PII data may be encrypted with a different encryption key during the re-encryption process. By encrypting each field with a different key, the encrypted data may be much more difficult for an unauthorized person to access. Further, by maintaining the data in a disassociated form, even if the data were breached, it would not be possible to reassemble the PII data.

In some embodiments, each encrypted data item may be stored with a breach identifier corresponding to the data exposure event in which the compromised data was exposed. In certain embodiments, a compromised company may provide the PII data with an identifier for each field provided by the company, and the compromised PII exchange system 102 may re-encrypt the PII data, the identifier, and the breach identifier. Other embodiments are also possible.

In certain embodiments, the compromised PII exchange system 102 may communicate with at-risk entities 104, 106, and 108 via a network 112. Each entity 104, 106, and 108 may maintain consumer/customer data 114, 116, and 118, respectively. The compromised PII exchange system 102 may also communicate via the network 112 with computing device 120, such as smart phones, laptops, tablets, notebooks, or other data processing devices, at least some of which may be associated with particular consumers.

In certain embodiments, a consumer or an at-risk entity may want to determine if its data may correspond in some way to the data that was exposed. The consumer or at-risk entity may communicate at least a portion of its PII data to the compromised PII exchange system 102 for comparison against the compromised PII data 122. In some embodiments, the portion of the PII data may be disassociated and encrypted prior to transmission. The compromised PII exchange system 102 may re-encrypt the PII data in the same manner as the PII data stored in the compromised PII data 122 and may compare the re-encrypted PII data from the source to the compromised PII data 122. The compromised PII exchange system 102 may return data related to the results of the comparison.

In some embodiments, the data returned may include a risk assessment score based on the results of the comparison. For example, if the data corresponds to PII data that has previously been identified in a fraudulent transaction, or that the compromised entity data breach is actively being used in fraudulent ways, the risk assessment score may be high. In another example, if the data results correspond to a low-risk event (such as a lost laptop computer) or an older event with no known harm, the risk assessment score may be lower.

The compromised PII exchange system 102 may be configured to search data from multiple data sources 124, such as websites that are not indexed on search engines (e.g., websites associated with the "dark" web), to identify patterns of data that may represent PII data. Such patterns can include, but are not limited to, entity names (first name, last name, middle name or initial, etc.), social security numbers, driver's license numbers, email addresses, phone numbers, addresses, and other types of information that can be presented in a particular pattern, which pattern can be identified whether or not the information is labeled. In some instances, in response to identifying such a pattern, the compromised PII exchange system 102 may extract a URL that identifies or is associated with the data source (e.g., to completely identify PII found at the data source, or to provide a means to later return to the same website) or may, at that point, proceed to fully scrape the data from the data source for processing (to identify PII). In some embodiments, scraped data may be used to identify both PII and embedded URLs (for additional websites that may be searched for further PII).

The compromised PII exchange system 102 may include a risk assessment module 126 that may include a crawler application 128. The crawler application 128 may extract, transform, and load (i.e., scrape) data from one or more of the multiple data sources 124 (such as those identified by the search), and may store the scraped data in a database 130. The data sources 124 targeted by the crawler application 128 for scraping may be identified by URL data 132, which may be a list of websites/webpages, Internet Protocol addresses, or other URL data that can be used by the crawler application 128 to locate and access the data hosted by the data sources 124. In some embodiments, the URL data 132 may also include credentials for logging onto a particular data source 124. In some embodiments, the URL data 132 may further include a priority ranking for specific URLs, establishing an order for accessing identified sources/websites.

The risk assessment module 126 may further include pattern analytics 134 that may be used to process the scraped data 130 to identify patterns of data that may represent entity names, birthdates, email addresses, mailing addresses, social security numbers, phone numbers, and so on. Whether such information is prefaced by particular introductions such as "Name", "Address," "Birth Date", "Social Security Number", or not, the format or pattern of the data may suggest possible PII items. The portions of the scraped data that represent potential PII data may be provided to a PII detector 136, which may be configured to process the identified patterns to determine if the patterns can be PII information. For example, a social security number in the format of 000-00-0001 is not valid PII information because the number is not a valid social security number. Other false Positives may be eliminated based on the content of the pattern. In some embodiments, the PII detector 136 may be implemented as a machine learning engine or an artificial intelligence engine, which may be configured to learn over time. The potential PII data may be presented to an administrator via an alerting module 142, which may present the potential PII data within an interface, such as an Internet browser application, to allow the administrator to manually review the data to verify whether the potential PII data corresponds to actual PII data. The machine learning or AI engine may learn based on verification by the administrator.

In some embodiments, the PII detector 136 may provide potentially valid PII information to a PII comparator 138, which may be configured to search the disassociated PII data of the database 122 using the potentially valid PII information to determine a match. If a match is found, a risk scoring module 140 may determine and assign a risk score associated with the matched data item in the compromised PII data 122. If multiple matches are found from the scraped data 130, the risk scoring module 140 may increase a risk score associated with a breach event that corresponds to the various matches. Further, if no matches are found, the risk scoring module 140 may determine a risk score associated with the data.

In some embodiments, extracted patterns can be combined and quantified, resulting in a series of numbers that may be used to rank order the webpages based on a metric of page-relevance pertaining to compromised information in the extracted data from the websites. The relevance rank may determine the order by which the crawler 128 may return to the webpages later to extract additional information and may be used as part of the risk score determination (the most relevant websites will be returned to first and will have the most impact on the risk score). In certain embodiments, the pattern analytics 134 may identify patterns of digits representing commonly breached pieces of PII data, such as social security numbers, phone numbers, and credit card numbers, which may be verified by the PII detector 136. Further, the risk scoring module 140 may determine a risk score associated with the PII data, either based on the result of the comparison by the PII comparator 138 or independently.

In some embodiments to be described in greater detail later, a priority ranking of websites may be done after a website has been fully scraped and processed, providing a prioritized order for searching other websites identified from URLs detected at the website. As should be evident, the priority ranking of websites (establishing the priority in which websites represented by detected URLs will be scraped) is distinct from page order relevance of websites, which is based on the relevance of PII information found those websites.

In some embodiments, the results of the data pattern detection may also be provided to an administrator via an interface provided by the alerting module 142. The administrator may interact with the interface to review the results and to create a customized heuristic score that can be used to rank order the webpages from which the data patterns were extracted. The customized heuristic score may be determined based on the administrator's preference, knowledge, and expertise and so on. In some embodiments, the customized heuristic score may be used to supplement or complement the risk score that may be produced automatically by the risk scoring module 140. Further, the risk assessment module 126 may flexibly allow an administrator to attenuate or otherwise modulate the webpage rank ordering process to fit a desired PII profile preference.

In an example, data from a breach event may find its way onto a particular website to market the breach data to a potential buyer. The seller of the data may provide a limited portion of the stolen PII data (in the form of data samples) to enable the potential buyer to verify the data. However, the patterns of the data, even when the data is limited, may be detected by the pattern analytics 134 and verified by the PII detector 136 and the PII comparator 138, enabling detection of the compromised PII data available from an unauthorized data source 124. Once it is known that the compromised PII data is being shared or used from such data sources 124, the risk associated with reliance on such PII data as a correct indicator of a particular user increases dramatically, and the risk assessment score for that PII data should be increased to reflect the risk. Accordingly, the risk scoring module 140 is configured to adjust the score to reflect the risk. Further, the alerting module 142 may alert an administrator of the match, enabling the administrator to provide the source information and information related to the stolen PII data to law enforcement.

In certain embodiments, the compromised PII data 122 may include encrypted and disassociated data together with an event identifier. The event identifier may include a code or number associated with a particular data exposure event, such as a hack, a breach, or other unauthorized access or exposure of the data. Such events may include intentional or unintentional releases of secure information to an untrusted environment, including exposure due to concerted attacks or through accidental data leaks. Once exposed, the leaked data may be utilized for nefarious activities, such as account takeover, fraudulent credit applications and so on. By including an event identifier, subsequent usages of the data may be correlated to the data exposure event, making it possible to identify potentially fraudulent activity based on usage of such exposed data. Further, when multiple matches are found between the extracted or identified PII data patterns and the compromised PII data that share a common data exposure event, the risk score associated with any PII data that corresponds to the common data exposure event may be increased to reflect the potential that usage indicates potentially fraudulent activity.

In certain embodiments, the compromised PII exchange system 102 may operate as a data exchange to allow companies that have experienced a data breach (e.g., a compromised entity) to share (securely) at least an indication of correspondence of particular data to their compromised customer data. In some embodiments, the compromised entity 104, 106, 108 may disassociate its compromised customer data and encrypt the disassociated data before sending the encrypted disassociated PII data to the compromised PII exchange system 102. The compromised PII exchange system 102 may unencrypt the encrypted disassociated PII data and may re-encrypt the data using a different key for each field, which re-encrypted data may be stored in the database of compromised data 122. In some embodiments, data from multiple compromised entities may be aggregated and stored in the database or compromised data 122. In certain embodiments, the aggregated compromised data 122 may be stored in an encrypted and disassociated form, such that even the compromised PII exchange system 102 cannot recover data corresponding to a particular customer. The data may be encrypted with an event identifier associated with the particular compromising event. In certain embodiments, the compromised data may be searched to identify matches with received customer data, and the compromised PII exchange system 102 may be configured to provide an indication of potential risk based on a match or the absence of a match with the compromised data 122. Other embodiments are also possible.

In some embodiments, as discussed above, the risk assessment module 126 may be configured to scrape data (using the crawler 128) from a plurality of data sources 124, to store the data in a database 130, and to process the data to detect patterns using pattern analytics 134. Further, the risk assessment module may be configured to detect potential PII data (using PII detector 136), to compare the PII data to compromised PII data 122 using the PII comparator 138, and to selectively adjust a risk assessment score (using risk scoring module 140) according to the results of the comparison. The risk assessment score may be communicated to an at risk entity 104, 106, 108 in response to a request.

In certain embodiments, the risk assessment module 126 may be configured to utilize a text processing and relevance ranking framework to identify web pages (or other data sources 124), including information pertinent to data breaches and compromised credentials. The pattern analytics 134 may allow the risk assessment module 126 to flexibly extract specific patterns of digits, symbols and named entities that are relevant to identifying breached information. Extracted patterns can be combined and quantified, resulting in a series of numbers that may be used to rank order page-relevance pertaining to compromised information. In certain embodiments, the risk assessment module 126 may identify patterns of digits representing commonly breached pieces of PII data, such as social security numbers, phone numbers, and credit card numbers. Further, the risk assessment module 126 may identify named entities representing individual consumers whose personal information may have been compromised. Additionally, the risk assessment module 126 may identify email addresses and other suspicious patterns of digits and symbols that represent sensitive compromised information. As mentioned earlier, in some embodiments the risk assessment module 126 may also identify URLs embedded in the extracted data, where the identified URLs represent further webpages that may be scraped.

In some embodiments, the risk assessment module 126 may deploy new patterns of interest immediately, as research may reveal changes in breached data posting behavior, such as, for example, inclusion of additional digits in a social security number or phone number, encoding of numbers as letters, and other deceptive practices. In certain embodiments, the risk assessment module 126 may flexibly codify the semantic content of each page to produce broad descriptions of the topics and content of each page. Moreover, the risk assessment module 126 may quantify and aggregate patterns of interest into a numeric value or a set of numbers that may be used to rank order the relevance of currently available extracted information. Further, the risk assessment module 126 may incorporate both positive and negative information in the rank ordering procedure, and may allow for reviewing, identifying, cataloging, and tagging of relevant information as the result of the quantification process. In some embodiments, the risk assessment module 126 may allow for the implementation of supervised learning algorithms, such as logistic regression, gradient boosted trees, support vector machines, neural networks, or any other common classification technique, which methods may be used to refine and enhance the relevance ranking capabilities of the risk assessment module 126. In some embodiments, the results of the data pattern detection may also be provided to an administrator via an interface provided by the risk assessment module 126. The administrator may interact with the interface to review the results and to create a customized heuristic score that can be used to rank order the relevance of webpages from which the data patterns were extracted. The customized heuristic score may be determined based on the administrator's preference, knowledge, and expertise and so on. In some embodiments, the customized heuristic score may be used to supplement or complement the risk score that may be produced automatically by the risk assessment module 126. Further, the risk assessment module 126 may flexibly allow an administrator to attenuate or otherwise modulate the webpage relevance rank ordering process to fit a desired PII profile preference.

The risk assessment module 126 may allow for the use of relevant pages to expand the search for and acquisition of additional relevant information, such as by adding to the URL data 132 manually to direct the crawler 128 or other search modules to scan the associated pages. In some embodiments, the risk assessment module 126 may automatically extract consumer PII and credentials for inclusion in the scraped data 130. In some instances, the scraped data 130 may be made available for searching, whereby consumers can visit a website to search and verify if their information has been compromised. Other embodiments are also possible.

In some embodiments, the URL data 132 maintained at the risk assessment module 126 may include both (1) an initial list of URLs compiled/specified by or provided to the operator (or administrator) of the system 102 and (2) additional URLs that are detected in data scraped from the websites in the initial list. For example, the initial list may include URLs that have come to the attention of the operator of the system, such as by independent identification of websites that may be offering stolen PII data for sale. The initial websites identified in the initial list of URLs may be accessed and scraped. Additional URLs are identified as a result of the extraction of data from the websites identified in the initial list of URLs. For example, in addition to detecting PII data, the risk assessment module 126 may also detect URLs in the websites identified by the initial list of URLs. Those detected URLs may identify other websites (beyond those represented in the initial list of URLs) which may then be subsequently accessed and scraped in order to detect data representing PII (e.g., PII data beyond that detected at the initial websites) as well as additional URLs for even further websites to be accessed and scraped.

As will be described later in conjunction with FIGS. 13 and 14A-14B, the additional URLs in the URL data 132 (beyond those in an initial list) can be priority ranked according to the website in which the URL data was identified, so that the crawler application 128 may scrape data from the data sources 124 in a prioritized fashion, in order to improve the efficiency of the risk assessment module 126 in searching websites and identifying patterns of data that may represent PII data. Thus, the URL data 132 may identify the initial list of websites to be visited, and after those sites are scraped, identify additional websites to be visited. Data patterns are analyzed in order to rank the sites to be visited.

The pattern analytics 134 in the risk assessment module 126 may thus be used to identify patterns of data representing URLs. Briefly, in one embodiment URLs may be identified by detecting a data pattern that resembles a domain name. For example, a segment or portion of data that includes a word or series of characters followed by a top level domain (e.g., a word or characters followed by a ".com," ".net," or ".onion") can be determined to be a URL that provides a link or address to another website, and that other website can be subsequently accessed for extracting data to find PII data (and also links to even further websites).

In certain embodiments, the compromised company may be unwilling to share its PII data for hosting by another party. In such an instance, the compromised PII exchange system 102 may cooperate with an installable software implementation of the PII exchange application, which may be distributed to each of the compromised systems in order to perform the risk assessment checks. One possible example of a distributed exchange system is described below with respect to FIG. 2.

Figure 2:
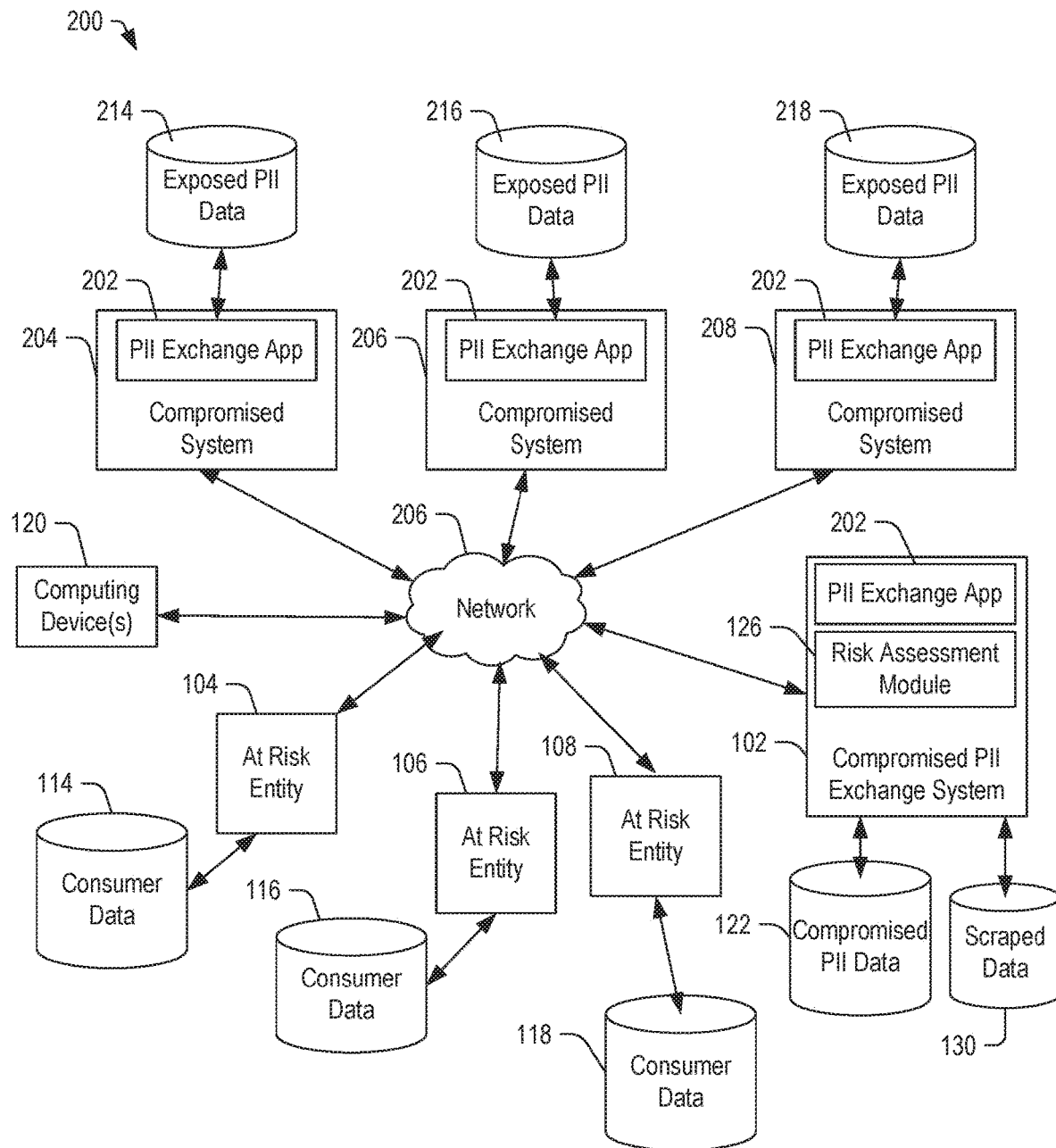
FIG. 2 depicts a block diagram of a compromised identity exchange system including distributed data sources, in accordance with certain embodiments of the present disclosure.

FIG. 2 is a block diagram of a system 200 including the compromised PII exchange system 102, in accordance with certain embodiments of the present disclosure. In some embodiments, the system 200 may be an embodiment of the system 100 of FIG. 1.

The system 200 may include the compromised PII exchange system 102 configured to communicate with the exposed or compromised entities 204, 206, and 208 through secure communications links. In certain embodiments, the exposed or compromised entities 204, 206, and 208 may store customer PII data, some of which may have been exposed. In the illustrated example, each compromised entity or system 204, 206, and 208 may install a PII exchange application 202, which may be used to disassociate and encrypt each field of the compromised PII data (using different keys) to produce re-encrypted exposed PII data 214, 216, and 218, respectively. Further, PII exchange application 202 may communicate with a PII exchange application 202 at the compromised PII exchange system 102 to verify PII data from consumers and at-risk entities as previously discussed.

In certain embodiments, each compromised system 204, 206, and 208 may maintain and host its own compromised data (at databases 214, 216 and 218), which data has been disassociated and re-encrypted by the PII exchange application 202. In certain embodiments, in response to receiving PII data from a source, such as an at-risk entity 104, 106, or 108, or from a computing device 120, the PII exchange application 202 of the compromised PII exchange system 102 may re-encrypt the PII data. The compromised PII exchange system 102 may send the re-encrypted PII data to the PII exchange applications 202 at the compromised systems 204, 206, and 208 so that they may search the exposed PII data 214, 216, and 218. Each PII exchange application 202 may communicate data related to the comparison to the PII exchange application 202 at the compromised PII exchange system 102.

Further, in some embodiments, the compromised PII exchange system 102 may include a risk assessment module 126, as discussed with respect to FIG. 1. In this example, the risk assessment module 126 may determine risk assessment scores and may communicate the risk assessment score information to the PII exchange applications 202. Additionally, as discussed above, the risk assessment module 126 may be configured to search one or more data sources for patterns of data that may correspond to PII data. The data patterns may be evaluated automatically on a per page score to determine relevancy ranking. The risk assessment module 126 may utilize the relevancy ranking to determine an order in which data may be extracted and processed (or presented to an administrator). Additionally, the ranking may be used as part of a risk assessment score, such that higher relevancy scores may indicate a higher risk with respect to the PII data. Further, once the data is extracted and processed, the data may be stored within the compromised PII data 122 as a new data breach, compared against data stored in the compromised PII data 122 to update a risk score associated with any matches of such data, shared with each compromised system 204, 206, and 208, or any combination thereof.

Further, in some embodiments, the results of the data pattern detection may also be provided to an administrator via an interface provided by the risk assessment system 126. The administrator may interact with the interface to review the data pattern results and to create a customized heuristic score that can be used to rank order the webpages from which the data patterns were extracted. The customized heuristic score may be determined based on the administrator's preference, knowledge, and expertise and so on. In some embodiments, the customized heuristic score may be used to supplement or complement the risk score that may be produced automatically by the risk assessment module 126. Further, the administrator may interact with the interface to configure or customize a webpage rank ordering process to produce an adjusted PII profile preference.

In some embodiments, the PII exchange applications 202 may periodically request risk assessment score information from the PII exchange system 102 to update its stored data. In response to the request, the risk assessment module 126 may compare data from the requesting PII exchange application 202 to the scraped data 130 and selectively adjust the risk score for portions of the received PII data that matches data from the scraped data 130. The compromised PII exchange system 102 may return a risk score to the requesting PII application 202.

In certain embodiments, the compromised PII exchange system 102 may aggregate the results and provide data corresponding to the results to the source of the request (e.g., an at-risk entity 104, 106, 108, or a consumer using a computing device 120). The data corresponding to the results may include a composite risk assessment score based on the results. For example, if the particular data is associated with multiple (exposed) data sets, the composite risk assessment score may be higher than if it was associated with only one. Further, if the particular data is associated with any of the exposed data sets, the result of the comparison from the various PII exchange applications 202 may include an identifier associated with the particular exposure event (e.g., how was the data exposed?). This identifier may also contribute to the risk assessment score, since an exposure due to a hacking event may have a different risk assessment than one due to a missing laptop computer or a lost credit card. Various examples of methods of determining the risk assessment score are discussed below.

Figure 3:
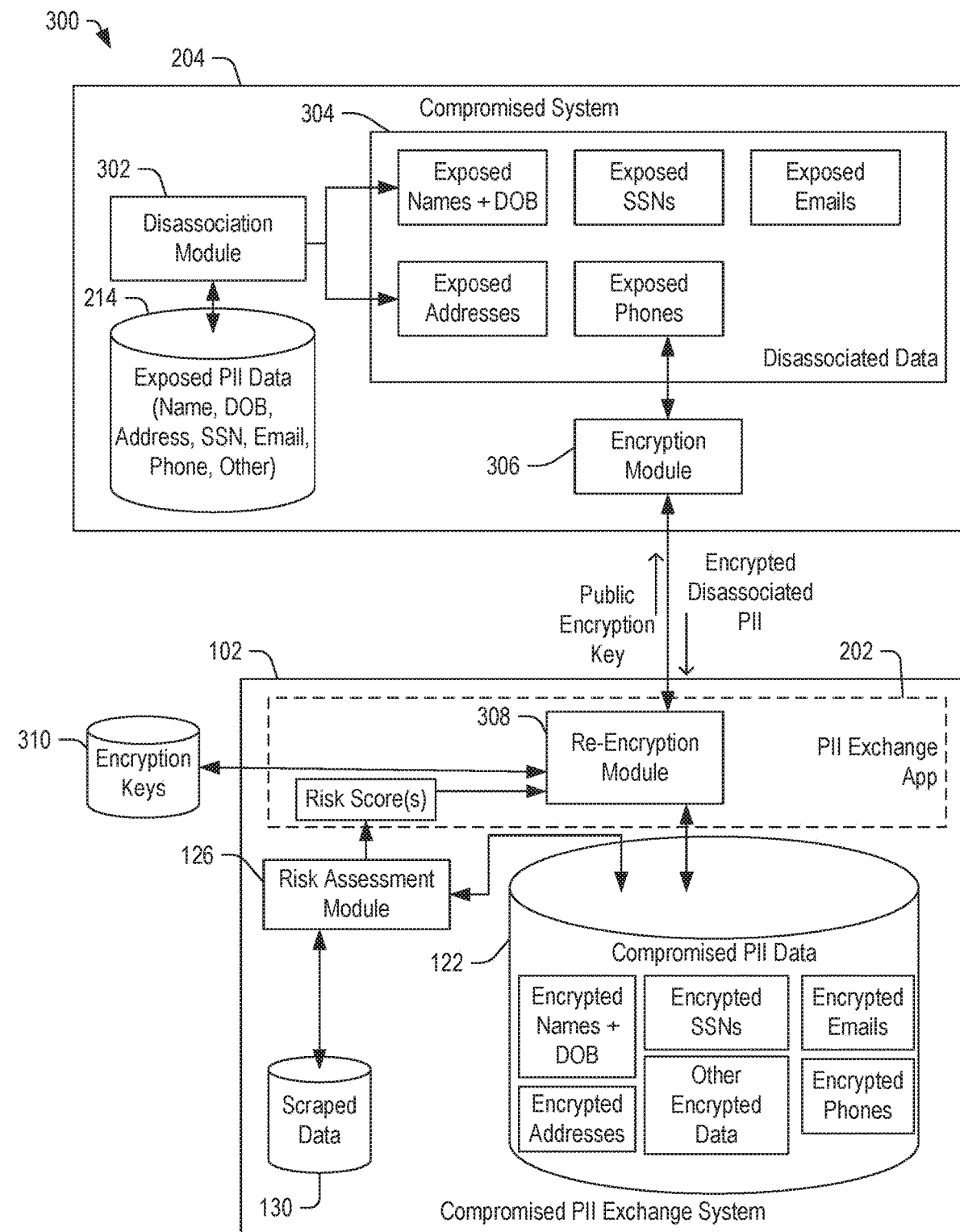
FIG. 3 depicts a block diagram of a compromised identity exchange system, in accordance with certain embodiments of the present disclosure.

FIG. 3 is a block diagram of a system 300 including a compromised identity exchange system 102, in accordance with certain embodiments of the present disclosure. The system 300 may include a compromised system 204 configured to communicate with the compromised PII exchange system 102. The compromised system 204 may be a company that has experienced a data breach or other authorized exposure of consumer data.

The compromised entity 204 may include the exposed PII data 214 in a database. The exposed PII data 214 may include exposed names, dates of birth, social security numbers, addresses, phone numbers, email addresses, other data, or any combination thereof. The compromised company 204 may disassociate the PII data using a disassociation module 302 to form disassociated data 304. The disassociated data 304 may include the PII data in an unassociated form so that the PII data cannot be recovered from the disassociated data 304 to associate the data to a particular consumer. The disassociated data 304 may then be encrypted using a unique key using an encryption module 306, which may be provided by or shared with the compromised PII exchange system 102. The encrypted, disassociated PII data may be sent to the compromised PII exchange system 102.

The compromised PII exchange system 102 may unencrypt the received PII data and may re-encrypt the PII data using a re-encryption module 308 of the PII exchange application 202. In certain embodiments, the re-encryption module 308 may re-encrypt the PII data using a unique key from a plurality of encryption keys 310 for each field to produce compromised PII data 122. The plurality of encryption keys 310 may be remote from the compromised PII exchange system 102. In certain embodiments, incoming compromised PII data may be formatted, encrypted and aggregated with the compromised PII data 122.

The compromised PII exchange system 102 may include the risk assessment module 126 and scraped data 130. The risk assessment module 126 may process received disassociated PII items against the scraped data 130 to determine a risk score. In some embodiments, pattern data scraped from one or more data sources and verified as PII data may be disassociated, encrypted, and stored in the compromised PII data 122, as if the data represented a new data breach. Further, in some embodiments, the risk assessment module 126 may compare portions of the scraped data 130 to data stored in the compromised PII data 122. In response to detecting a match, the risk assessment module 126 may update a risk score associated with the matched data.

In some embodiments, the risk assessment module 126 may provide an interface including the scraped data 130 or other information to an administrator. The administrator may interact with the interface to review the results and to create a customized heuristic score that can be used to rank order the webpages from which the data patterns were extracted, to adjust the webpage rank ordering process to produce an adjusted rank ordering process, or any combination thereof.

In certain embodiments, since all PII data stored by the compromised PII exchange system 102 has been disassociated, there may be cases where multiple elements of the original PII data match the exposed identity database in the compromised PII data 122; however, the matching data may not necessarily be associated with each other from the same original consumer identity. For example, a common name, such as "John Smith," and a common address, such as "123 Main Street," might match data within the re-encrypted compromised PII data 122; however, the matching data may be sourced from different records. Because the PII data has been disassociated prior to being received by the compromised PII exchange system 102, neither the compromised PII exchange system 102 nor the end-user will know how the match was achieved.

In general, two potential attack vectors exist for attacking the compromised PII exchange system 102. One possible attack involves a bad actor able to intercept transmission of data to the compromised PII exchange system 102. Another possible attack involves a hack or breach of the compromised PII exchange system 102. However, attacks of the first kind can be handled using industry standard transmission policies, with the additional precaution of using unique public/private key combinations for each participant. The only way a third party could decrypt this data would be if they had access to a private key of the compromised PII exchange system 102, which means that attacks of the first kind rely on an attack of the second type.

In the unlikely event that the compromised PII exchange system 102 is hacked, an intruder could gain access to the database (i.e., the compromised PII data 122). However, since all the PII fields in the compromised PII data 122 are encrypted using different keys and since the PII fields are disassociated, such a hack would still not expose the data. In order to gain access to the raw data, the intruder would also need to gain access to the key-store (encryption keys 310) of the compromised PII exchange system 102, which cannot be accessed by breaching the compromised PII exchange system 102. In certain embodiments, the encryption keys 310 may be stored in another location remote from the compromised PII data 122 and remote from the compromised PII exchange system 102 to provide an additional layer of protection. Even in the event that a hacker was able to penetrate the compromised PII exchange system 102 as well as the encryption keys 310, the hacker would only be able to access individual, un-linkable (disassociated) PII elements, which are of relatively little value.

Figure 4:
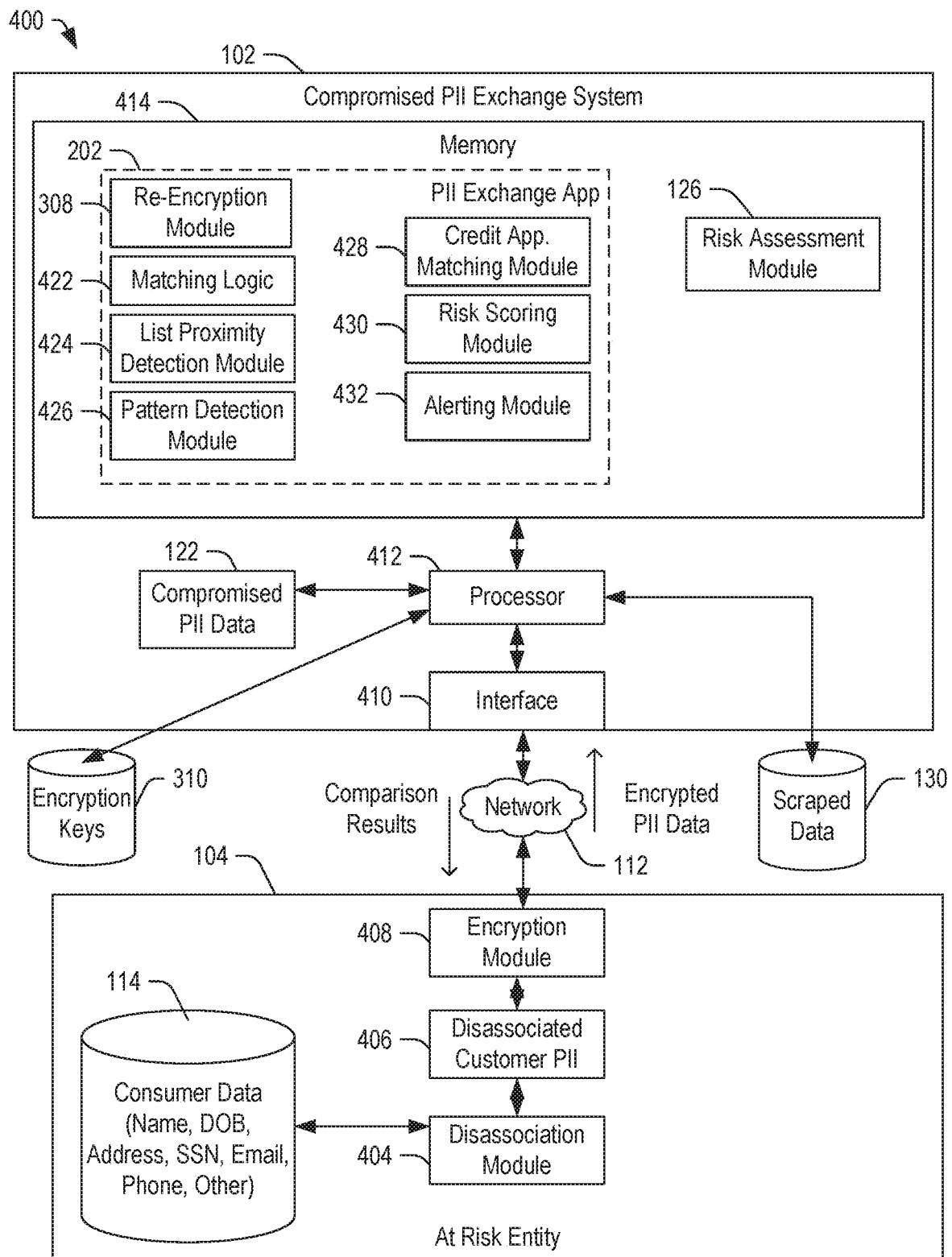
FIG. 4 depicts a block diagram of a compromised identity exchange system, in accordance with certain embodiments of the present disclosure.

FIG. 4 is a block diagram of a system 400 including compromised PII exchange system 102, in accordance with certain embodiments of the present disclosure. The system 400 may include an at-risk entity 104 configured to communicate with the compromised PII exchange system 102 via the network 112. The at-risk entity 104 may host consumer data 114 in one or more databases. The consumer data 114 may include names, dates of birth, addresses, phone numbers, emails, social security numbers, other information, or any combination thereof.

In certain embodiments, the at-risk entity 104 may include consumer data 114, which data may need to be evaluated for risk due to a data exposure event at another company. The at-risk entity 104 may extract at least a portion of the consumer data 114 and process the PII data using a disassociation module 404 to produce disassociated customer PII data 406. The at-risk entity 104 may process the disassociated customer PII data 406 using an encryption module 408 and may send the encrypted disassociated PII data to the compromised PII exchange system 102.

The compromised PII exchange system 102 may include an interface 410 coupled to the network 112 and to a processor 412, which may be coupled to compromised PII data 122, to the scraped data 130 and to a memory 414. In some embodiments, the scraped data 130 may be stored within the memory 414. In some embodiments, the scraped data 130 may be encrypted using the same encryption keys 310 as used with the PII data. In certain embodiments, the memory 414 may include data and a PII exchange application 202. The PII exchange application 202 may be executed by the processor 412 to verify the PII data against the compromised PII data 122. Further, the memory 414 may include the risk assessment module 126.

In certain embodiments, the PII exchange application 202 may include a re-encryption module 308 configured to unencrypt the encrypted PII data from the at-risk entity 104 and to re-encrypt each field of the PII data with a different one of the encryption keys 310. The PII exchange application 202 may provide the re-encrypted data to the matching logic 422, which may cause the processor 412 to compare the PII data to the compromised PII data 122 to determine whether a match exists. Further, the PII exchange application 202 may utilize the risk assessment module 126 to compare the encrypted data to the scraped data 130 to determine a match. The risk assessment module 126 may provide data related to the comparison to the risk scoring module 430, which may use the data in the determination of the risk assessment score. The PII exchange application 202 may provide the results of the comparison to the risk scoring module 430, which may determine a risk assessment score and provide the score to an alerting module 432 that, when executed, may cause the processor 412 to communicate data related to the risk assessment score to the at-risk entity 104.

In certain embodiments, the PII exchange application 202 may include one or more modules to analyze matches. In certain embodiments, the PII exchange application 202 may quantify activity level based on the number of matches as one quantitative risk factor. In some embodiments, the PII exchange application 202 may include a list proximity detection module 424 that, when executed, may cause the processor 412 to identify proximity of a particular match to other previous matches or to other matches within the PII data. In some embodiments, proximity may refer to the proximity of the data to other data in the table of data, which proximity may suggest fraudulent activity involving a portion of the compromised data. In certain embodiments, the proximity may refer to a geographic proximity of addresses suggesting that a crime syndicate may be operating within a particular region or area.

In certain embodiments, the PII exchange application 202 may also include a pattern detection module 426 that, when executed, may cause the processor 412 to identify a pattern with respect to area, neighborhood, names, or other matching PII data. The pattern detection provided by the pattern detection module 426 may differ from the type of pattern detection applied by the risk assessment module 126. The pattern analytics 134 of the risk assessment module 126 may look for arrangements of numbers (that can resemble a social security number, a phone number, a birth date or a street address), arrangements of words (that can resemble a full name, a place of work, a street, and so on), arrangements of letters and numbers (that can represent a mailing address, a password, and so on), and other types of patterns. The portions of the data that fit one of the possible patterns may be used to search the scraped data 130.

In certain embodiments, the PII exchange application 202 may include a credit application matching module 428 that, when executed, may cause the processor 412 to store data corresponding to matches in the compromised PII data. Further, the credit application matching module 428 may detect multiple fraudulent credit applications based on the stored credit application data. In certain embodiments, the matching logic 422 may search the stored credit application data to detect potential fraudulent activity.

In certain embodiments, the risk scoring module 430 may cause the processor to evaluate risk based on a variety of characteristics of the fraud data, the consumer and of the breach. For example, a particular data breach may involve 15 million records. In such a case, the probability that a particular data item may be misused may be approximately one out of fifteen million, indicating a relatively low risk. However, multiple matches of PII data items associated with that breach to the scraped data 130 may indicate that the data from the breach may have been sold or may be at an elevated risk of misuse.

In contrast, if the data breach involved only 20 records, then the probability may be one out of twenty, which high probability increases the potential risk. If the higher probability is also coupled with a match by the risk assessment module 126 to the scraped data 130, the risk assessment valuation by the risk scoring module 430 may be increased.

Other factors that can influence the risk assessment scoring module 430 may include facts about the data breach, including how the data was exposed, when the data was exposed and so on. A risk score for a particular consumer may increase based on the number of data breaches for which PII data of that user has been included. Further, if various instances of matches correspond to known or suspected fraud events, the matches suggest that the data is being used, and thus the risk increases substantially. Other embodiments are also possible.

In certain embodiments, the risk scoring module 430 may implement a heuristic approach that takes into account one or more factors associated with the breach and with the matching of the PII data. The heuristic approach may be extended to information determined by the risk assessment module 126 with respect to the scraped data 130. In certain embodiments, the matching logic 422 may cause the processor 412 to match PII elements with the data in the compromised PII data 122 to look for a number of matches, where the breach occurred, the severity of the breach, the general statistical sense of risk, and so on. The matching logic 422 may further cause the processor 412 to utilize the risk assessment module 126 to compare data items to the scraped data 130 to determine if actual instances of exposure have been verified from various websites, for example. The data from the matching logic 422 and the results of the comparison from the risk assessment module 126 may then be provided to the risk scoring module 430, which may determine a risk score. In certain embodiments, the alerting module 432 may cause the processor 412 to provide the comparison results including the risk assessment score to the at-risk entity 104 through the network 112. In some embodiments, the alerting module 432 may also provide an interface including the PII data or other information to an administrator. The administrator may interact with the interface to review the results and to create a customized heuristic score that can be used to rank order the relevance of webpages from which the data patterns were extracted, to adjust the webpage rank ordering process to produce an adjusted rank ordering process, or any combination thereof. Subsequently, the risk scoring module 430 may utilize the customized heuristic process to determine the risk score or may combine a score produced using the customized heuristic process with a score determined by the risk scoring module to determine the risk score. Other embodiments are also possible.

In some embodiments, pattern data scraped from one or more data sources and verified as PII data (using the risk assessment module 126) may be disassociated, encrypted, and stored in the compromised PII data 122, as if the data represented a new data breach. Further, in some embodiments, the risk assessment module 126 may cause the processor 412 to compare portions of the scraped data 130 to data stored in the compromised PII data 122. In response to detecting a match, the risk assessment module 126 may update a risk score associated with the matched data. In addition and even if a match is not found, the risk assessment module 126 may cause the processor 412 to store the scraped data in the compromised PII data 122 as newly compromised data.

In the example of FIGS. 3 and 4, the compromised or exposed entity communicated the exposed PII data to the compromised PII exchange system 102. In some embodiments, the compromised or exposed entity may be reluctant to provide the exposed PII data to a third party exchange. Accordingly, the PII exchange application 202 may be deployed for use by the exposed entity.

Figure 5:
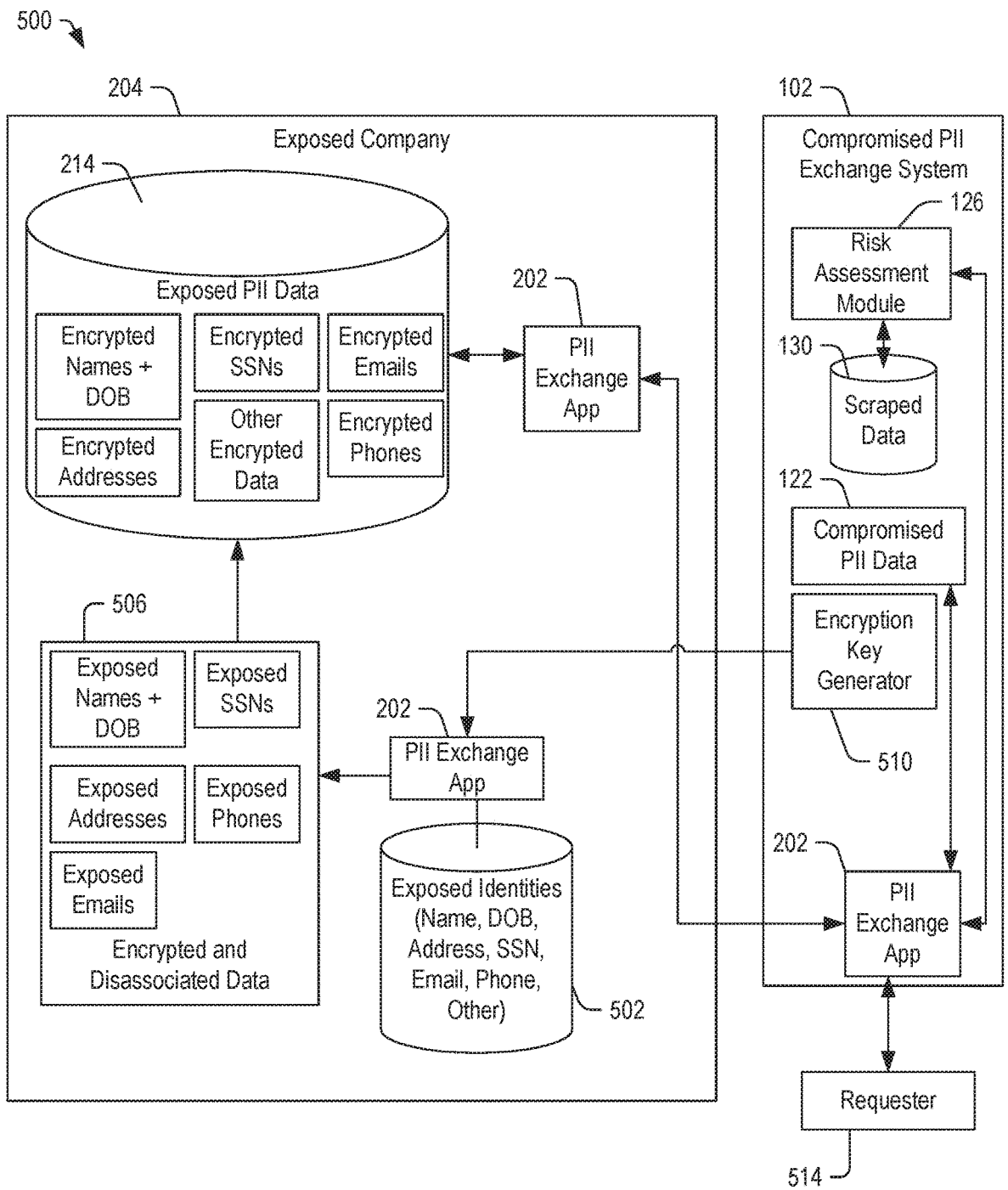
FIG. 5 depicts a block diagram of a compromised identity exchange system including a distributed data source, in accordance with certain embodiments of the present disclosure.

FIG. 5 depicts a block diagram of a compromised identity exchange system 500 including a distributed data source, in accordance with certain embodiments of the present disclosure. The system 500 may include an exposed entity 204 configured to communicate with a compromised PII exchange system 102, such as the compromised PII exchange systems described above with respect to FIGS. 1-4. In certain embodiments, the exposed company 204 and the compromised PII exchange system 102 may both include a PII exchange application 202.

In certain embodiments, the exposed company 204 may include exposed identity data 502. The exposed company 204 may utilize the PII exchange application 202 to disassociate and encrypt the data to form encrypted and disassociated data 506, which may be stored in exposed PII data 214. In certain embodiments, the PII exchange application 202 may generate one or more encryption keys or may receive one or more encryption keys from the compromised PII exchange system 102. In certain embodiments, the PII exchange application 202 may encrypt each item of disassociated data using a different encryption key. In some embodiments, each item may also be encrypted with an associated event identifier and a unique identifier that can be used to re-associate the data at a later time, if needed. The unique identifier may be stored in a table or database at another location and may be used to restore the disassociated data to recover a complete PII data set for a consumer, if desired.

In certain embodiments, a requester 514 may provide data to the compromised PII exchange system 102, which may unencrypt and re-encrypt the data using a PII exchange application 202. The re-encrypted data may be compared to compromised PII data 122 and may be sent to the PII exchange application 202 of the exposed entity 204. The PII exchange application 202 may unencrypt and re-encrypt the data and compare the data to the exposed PII data 214. The results from both comparisons may be reported to the PII exchange application 202 of the compromised PII exchange system 102, and the PII exchange application 202 may determine a risk assessment score and report the data to the requester 514.

In this example, the PII exchange system 102 may also include the risk assessment module 126 and the scraped data 130. The risk assessment module 126 may inform the risk assessment score based on matches between the encrypted PII data relative to the scraped data 130, which may be similarly encrypted. Further, the risk assessment module 126 may store the data in the exposed PII data via the PII exchange application 202 as newly compromised data. In response to a match, the risk assessment score may be increased. Further, in response to multiple matches, a risk assessment for a particular exposure event may be increased to account for the likely increased risk.

Further, in determining the risk assessment score, the risk assessment module 126 may utilize a customized heuristic process produced by an administrator to determine the risk score, may combine a score produced using the customized heuristic process with a score determined by the risk scoring module to determine the risk score, or may determine a risk score based on its own determination.

Figure 6:
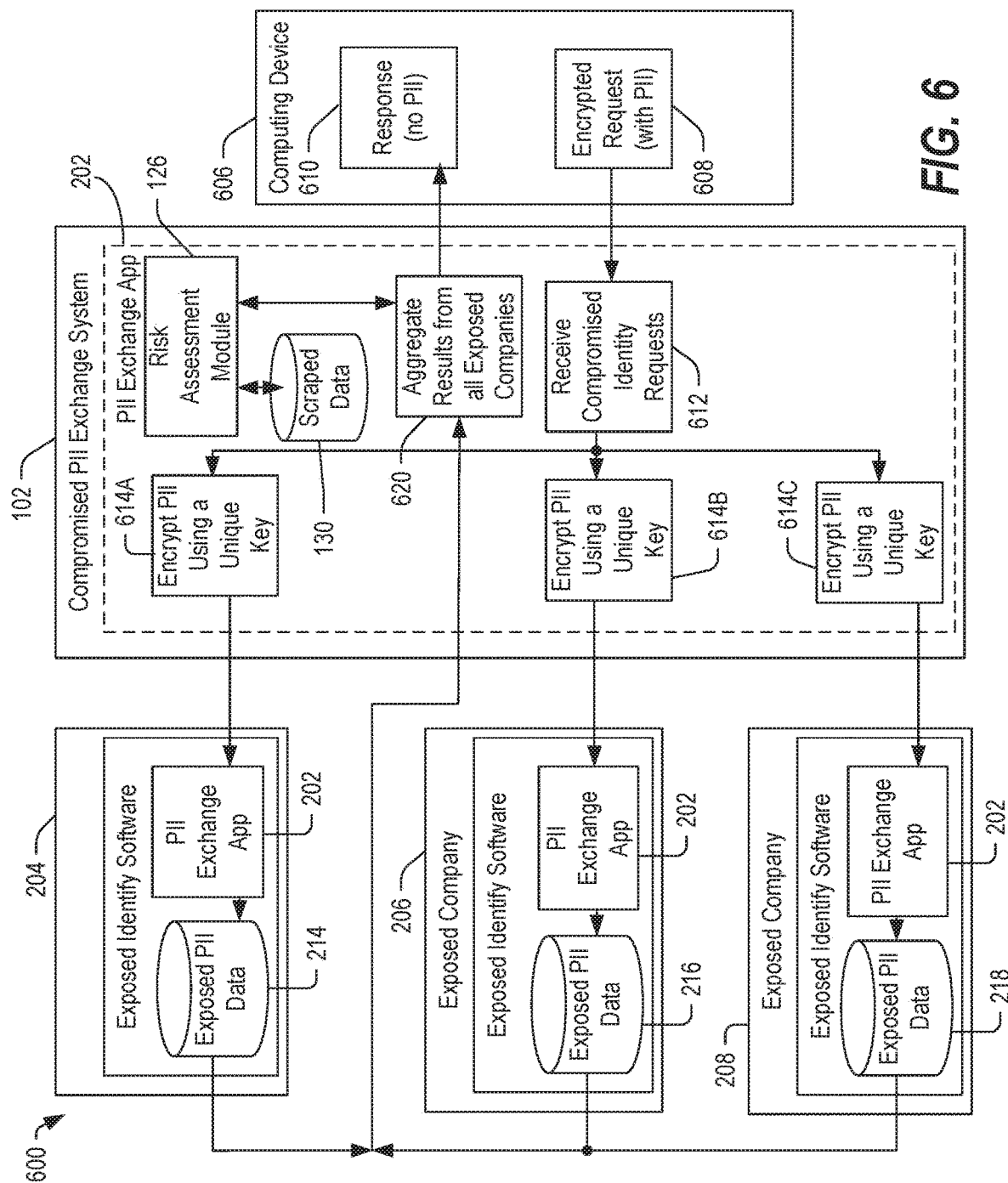
FIG. 6 depicts a block diagram of a compromised identity exchange system including distributed data sources, in accordance with certain embodiments of the present disclosure.

Referring now to FIG. 6, a system 600 is shown that includes exposed entities 204, 206, and 208 configured to communicate with a compromised PII exchange system 102, which is configured to communicate with a computing device 606. In some embodiments, the computing device 606 may be operated by an end user. In certain embodiments, a user may interact with the compromised PII exchange system 102 to verify that his/her PII data has not been compromised.

In certain embodiments, a user may interact with the computing device 606 to access an Internet browser application through which the user may visit a web page/site hosted by the compromised PII exchange system 102. The user may enter his or her PII data in the web page and submit the PII data securely as an encrypted request 608 to the compromised PII exchange system 102.

In certain embodiments, the compromised PII exchange system 102 may unencrypt the compromised identity requests at 612, and may re-encrypt the PII using unique keys at 614A, 614B, and 614C for transmission to the exposed companies 204, 206, and 208, respectively.

The PII exchange application 202 at each exposed entity 204, 206, and 208 may compare the PII data to its exposed PII data 214, 216, and 218. In certain embodiments, at each exposed entity 204, 206, and 208, the PII exchange application 202 may unencrypt the PII data and re-encrypt the PII data with keys that correspond to the keys used to encrypt the data in the exposed PII data 214, 216, and 218. The PII exchange application 202 at each of the exposed companies 204, 206, and 208 may then search the exposed PII data 214, 216, and 218 to identify a match and may return data corresponding to the comparison to the compromised PII data exchange 102.

In this example, the risk assessment module 126 and the scraped data 130 may be included within the PII exchange application 202 at the compromised PII exchange system 102. In this embodiment, each of the PII exchange applications 202 at each of the exposed entities 204, 206, and 208 may include a risk assessment module 126 that may communicate with the scraped data 130, which may be stored at the compromised PII exchange system 102.

In some embodiments, in response to receiving PII data at the compromised PII exchange system 102 from a computing device 606, the PII application 202 may encrypt the PII data and send the encrypted data to the exposed companies 204, 206, and 208. Further, the PII application 202 may use the risk assessment module 126 to update the encoded PII data 214, 216, and 218; to update another database; to compare the received PII data to the scraped data 130; or any combination thereof. Further, the exposed companies 204, 206, and 208 may search their respective exposed PII data 214, 216, and 218 and may report the results to the compromised PII exchange system 102, which may aggregate the results together with the results from the risk assessment module 126 and which may report the response (without PII data) to the requesting computing device 606.

In some embodiments, one or more of the exposed companies 204, 206, and 208 may also act as the computing device 606 to send the PII data to the compromised PII exchange system 102 for a risk assessment that crosses multiple entities. By providing an exchange that allows for verification of use of such exposed PII data, companies may have the ability to validate risk across multiple entities and without exposing the PII data to their competitors. Further, by comparing the PII data to scraped data 130, detection of the exposure on various websites can be used to elevate the potential risk assessment score to enable an at-risk company to perform an elevated evaluation for extending credit or allowing an account takeover, for example.

In certain embodiments, the compromised PII data exchange 102 may aggregate the results from all of the exposed companies 204, 206, 208 and from the risk assessment module 126 and may provide results (response with no PII data) 610 to the computing device 606. In certain embodiments, the compromised PII exchange system 102 may analyze the aggregate data and the data from the risk assessment module 126 to assess the risk and may provide a report including a risk assessment score to the computing device 606. Other embodiments are also possible.

Figure 7:
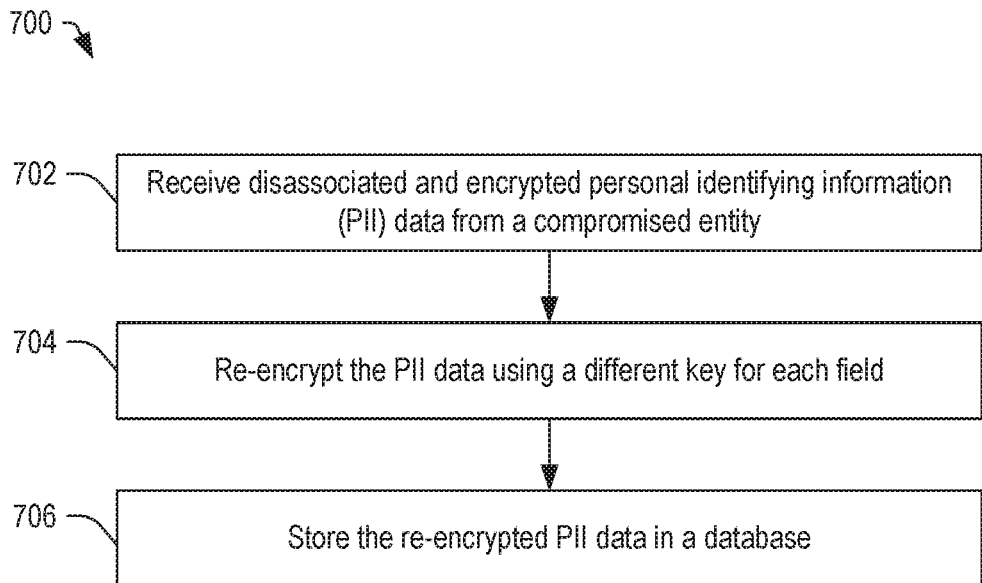
FIG. 7 depicts a flow diagram of a method of exchanging compromised identity data, in accordance with certain embodiments of the present disclosure.

FIG. 7 is a flow diagram of a method 700 of exchanging compromised identity data, in accordance with certain embodiments of the present disclosure. At 702, the method 700 may include receiving disassociated and encrypted PII data from a compromised entity. The method 700 may further include re-encrypting the PII data using a different key for each field, at 704. The method 700 may also include storing the re-encrypted PII data in a database, at 706.

In certain embodiments, each field of the encrypted PII data may be stored with an exposure event identifier and with a unique identifier. In certain embodiments, data about the exposure event may be collected over time, and the identification of a match between PII data and data stored in the database may retrieve the matching data and the event identifier. A risk assessment may be determined, in part, based on facts relating to the exposure event. As discussed above, a large data breach may reduce the chance that a particular piece of information is being misused, while a smaller data breach may enhance the statistical probability. Further, in some embodiments, if the event was a lost laptop or other personal item, the probability may be impacted by the circumstances as well as the subsequent recovery or failure to recover the device. Over time, as data about the breach is collected, such data may be stored and used to evaluate particular matches in the data set.

Further, in some embodiments, the unique identifier stored with each field may be stored in a database, for example, at a remote location or with the data source (e.g., the compromised company that sent the data). Subsequently, the unique identifiers may be used to reassemble the PII data for a single individual (for example) from the disassociated PII data. This will only be possible if the compromised company keeps a mapping between the unique ID's of each identity element and the overall identity. Other embodiments are also possible.

Figure 8:
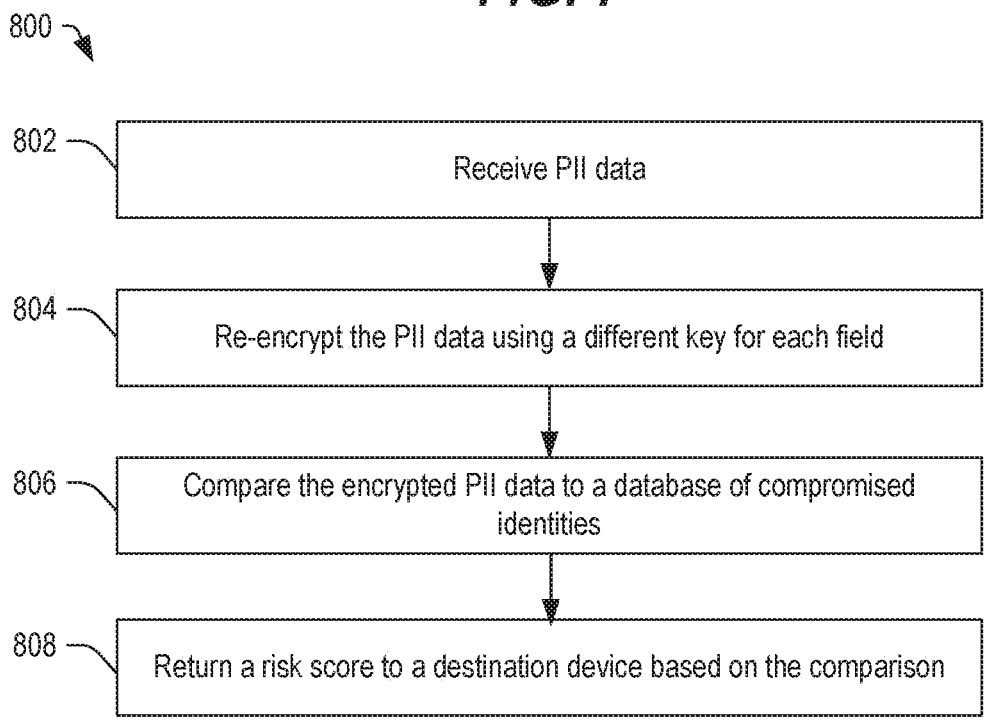
FIG. 8 depicts a flow diagram of a method determining a risk based on compromised data, in accordance with certain embodiments of the present disclosure.

FIG. 8 is a flow diagram of a method 800 of a method of exchanging compromised identity data, in accordance with certain embodiments of the present disclosure. At 802, the method 800 may include receiving PII data from a source. In some embodiments, the source may be an at-risk entity, a consumer, or another entity.

At 804, the method 800 may include re-encrypting the PII data using a different key for each field. In certain embodiments, the PII data may be unencrypted first and then re-encrypted using keys corresponding to those used to encrypt data in a particular database. In some embodiments, the PII data may be duplicated and separately encrypted for transmission to PII exchange applications at one or more compromised companies.

At 806, the method 800 may include comparing the encrypted PII data to a database of compromised identities. In certain embodiments, the re-encrypted PII data is compared to the data in the database locally. Further, the PII data (in encrypted form) may be sent to the compromised entities for comparison with their local data using the PII exchange applications on their systems. The method 800 may also include comparing the encrypted PII data to a database of scraped data, which may be similarly encrypted to identify potential matches.

At 808, the method 800 may include returning a risk score to a destination device based on the comparison. The risk score may be based both on a comparison to the database of compromised identities and on a comparison to the database of scraped data. In certain embodiments, the results from the comparisons (whether from the local PII database or from the compromised companies) may be aggregated and analyzed to determine the risk score. The aggregation may include the results from the comparison to the scraped data. In certain embodiments, the risk score may be based on a variety of data, including data about the breach event, data about the field that was matched (i.e., date of birth versus social security number), data about the frequency of the match (i.e., has this data been matched previously), data about other recent matches, and so on. Based on the data, a risk score may be calculated that can reflect the probability that a particular piece of consumer data may be misused. The information may be provided to the requesting company or individual, and the information may be used to make informed decisions with respect to credit applications and other decisions.

Figure 9:
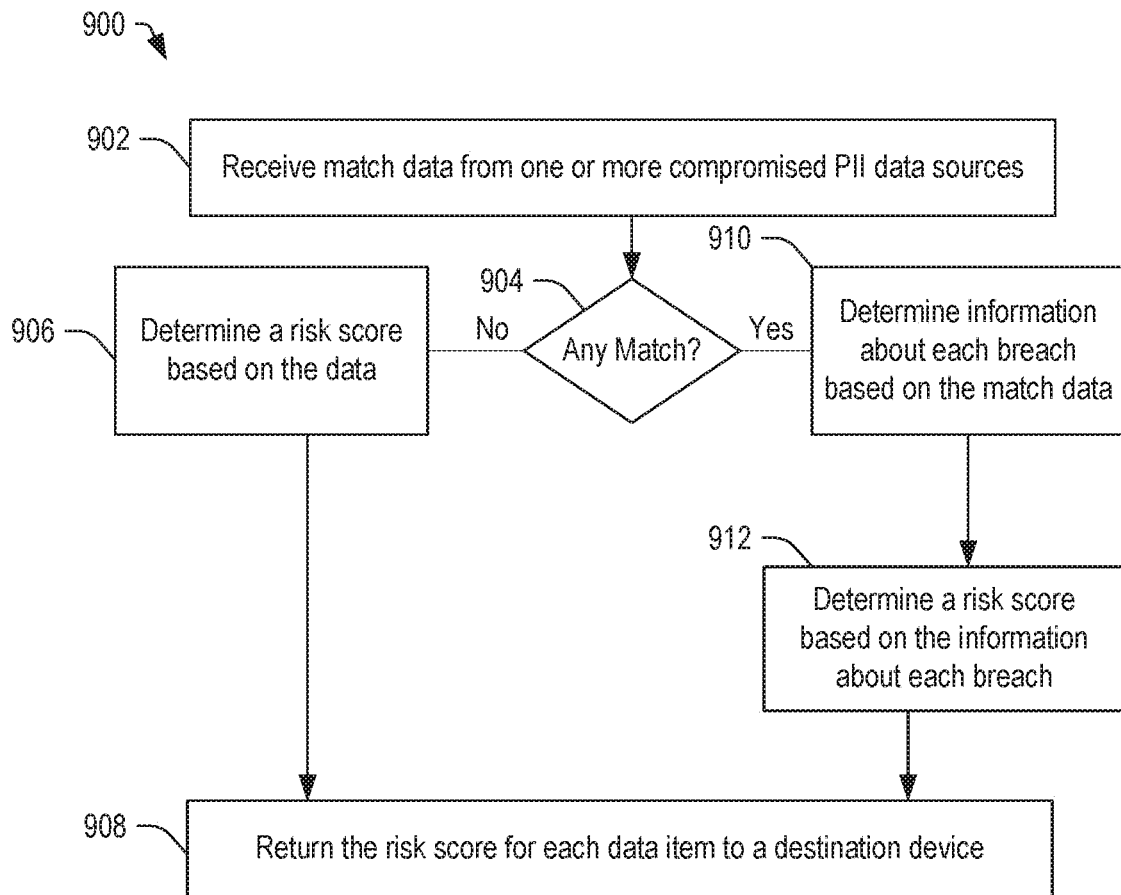
FIG. 9 depicts a flow diagram of a method of determining a risk score, in accordance with certain embodiments of the present disclosure.

FIG. 9 depicts a flow diagram of a method 900 of determining a risk score, in accordance with certain embodiments of the present disclosure. At 902, the method 900 includes receiving match data from one or more compromised PII data sources. The match data may include a breach identifier or a risk score associated with a particular breach or piece of data.

At 904, the method 900 includes determining if there are any matches. If not, the method 900 includes determining a low risk score based on the data, at 906. If there is a match at 904, the method 900 advances to 910 to determine information about each breach based on the match data. In some embodiments, the information about each breach may include a risk score reflecting multiple matches between the compromised PII data of a particular breach or data exposure event and data scraped from one or more web pages or other sources (e.g., from "dark" websites that cannot be accessed from indexed search engines). The method 900 may further include determining a risk score based on the information about each breach.

In certain embodiments, a piece of data may begin with a predetermined score, and each match may cause the system to deduct from the score. The deductions for each match may vary based on the severity of the breach that resulted in the data becoming compromised.

In certain embodiments, the deduction may be based on a received risk score, such that subsequent fraud events detected by one or more of the data sources may cause the risk score from that particular data source to be escalated. The received risk score may then be subtracted from the predetermined risk score to produce an aggregated score for that data item. In certain embodiments, reported fraud data, information about the data, and information about the breach may be used to develop a probabilistic score that can rank order the risk associated with a consumer and a certain event, which score may be used to assess risk with respect to a particular piece of data.

Once the risk score is determined (at 906 or 912), the method 900 may include returning the risk score for each data item to a destination device. In some embodiments, the risk score may represent a statistical likelihood that the data item has been compromised and may be (or have been) misused.

In some embodiments, the data returned may include a risk assessment score based on the results of the comparison. For example, if the data corresponds to PII data that has previously been identified in a fraudulent transaction, or that the compromised entity data breach is actively being used in fraudulent ways, the risk assessment score may be high. In another example, if the data results correspond to a low-risk event (such as a lost laptop computer) or an older event with no known harm, the risk assessment score may be lower. Each compromised PII data source may have different data points from which to determine a risk score. The resulting risk score data that is received by the data exchange may be aggregated to determine a composite risk score for each data item, and the composite score may be sent to the destination device.

Figure 10:
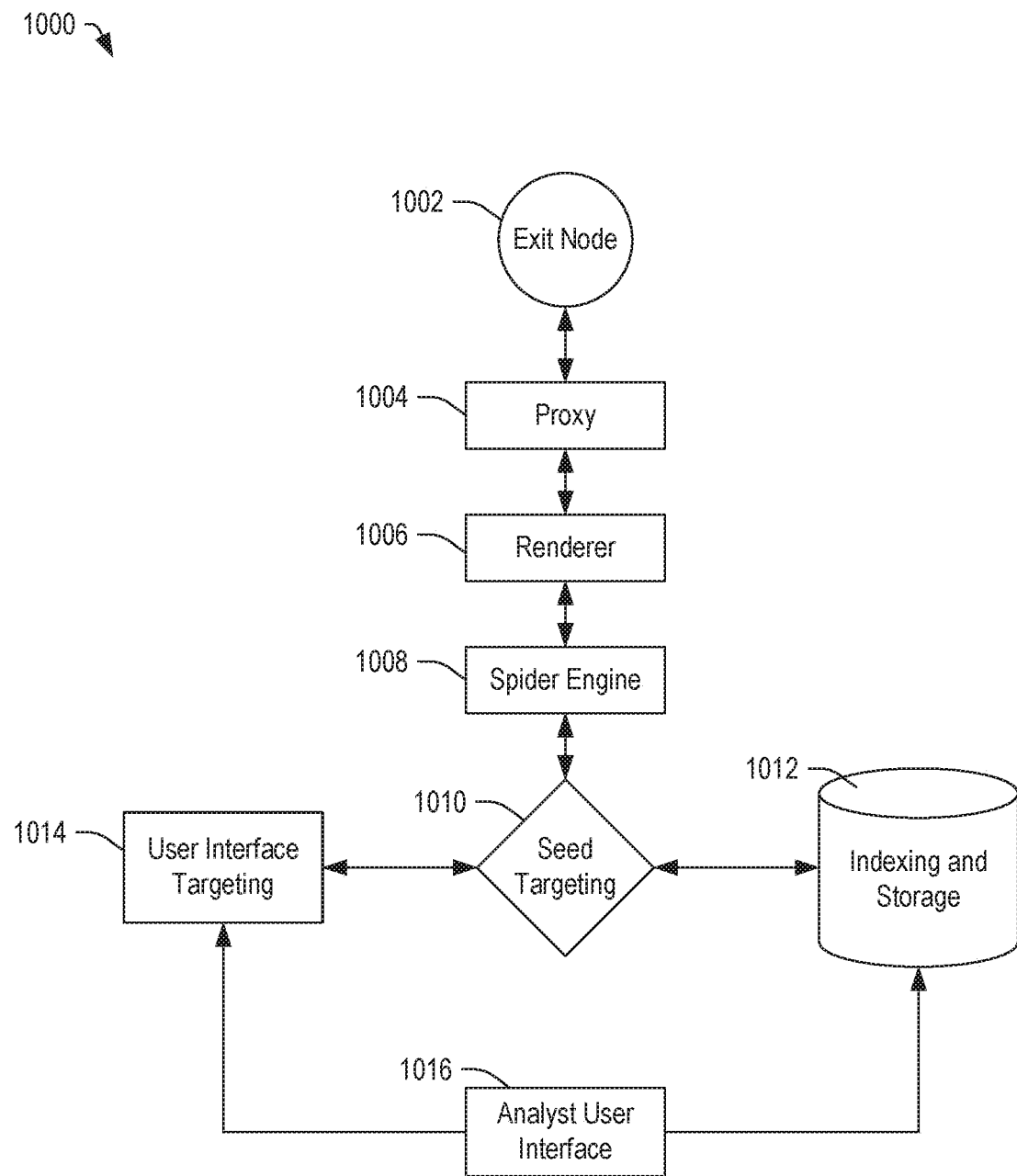
FIG. 10 depicts a conceptual diagram of a crawler application, in accordance with certain embodiments of the present disclosure.

FIG. 10 depicts a conceptual diagram of a crawler application 1000, in accordance with certain embodiments of the present disclosure. The crawler application 1000 may be an embodiment of the crawler 128 of FIG. 1. The crawler 1000 may utilize various open source licensed technologies, such as Berkeley Software Distribution (BSD) Licensed technologies. Such open source technologies can include various tools and frameworks, such as the Scrapy framework from www.scrapy.org, Splash (a lightweight Internet browser capable of processing multiple pages in parallel and capable of executing JavaScripts in the page context), the Tor browser from the Tor Project, the Elasticsearch search engine powered by Lucene, high powered Python web frameworks, such as Django, open source relational database management systems, such as PostgreSQL, and other data processing and storage frameworks.

The crawler 1000 may be configured to utilize an exit node, which is a gateway where encrypted traffic can enter the Internet anonymously. The crawler 100 utilizes a proxy for access to onion routing sites, such that the proxy disguises the origin of data requests by redirecting traffic on behalf of the crawler 1000. The crawler 1000 may also utilize a renderer 1006, such as a JavaScript rendering engine, which may be configured to access web pages, interact with various authentication protocols of such websites by providing credentials, and scrape data. Depending on the spider engine 1008 and the targeted site, the targeted site may or may not be engaged for the crawl. The renderer 1006 allows the crawler to interact with the target site by entering credentials for access.

In some embodiments, an analyst may access a user interface 1016 to enters or upload a list of URLs into the targeting interfaces 1014, e.g., representing an initial list of specified websites to be crawled. As described earlier, the list can be augmented automatically as sites are crawled and additional URL data is detected in the extracted data, with other sites added corresponding to the additional URL data. The URLs can be rendered in list format on a seed targeting page 1010. The seed targeting page can prioritize the crawling of webpages based on a priority ranking (e.g., priority ranking of additional URLs identified from extracted data). The spider engine 1008 can then gather information from the web pages corresponding to the seed lists. The spider scripts or code executed by the spider engine 1008 can scrape (extract, transform, and load) information from each targeted web page into an indexing and storage database 1012. The indexing and storage database 1012 may be an embodiment of the scraped data 130 in FIGS. 1-6.

In certain embodiments, individual scripts may be developed for the spider engine 1008 for broad or targeted crawls. Targeted crawls may include analyst provided credentials. Both broad and targeted crawls can engage standard XML libraries to extract text and then push crawled html documents into an indexing engine for indexing and storage in the database 1012. In some embodiments, an analyst may use the interface to check results of crawls and to update target lists of URLs. In some embodiments, lists of targeted crawls may be automatically updated with URLs identified from earlier crawled websites. Further, the database 1012 can be searched using various discovery tools and may be used for automated comparisons by the risk assessment module 126.

Figure 11:
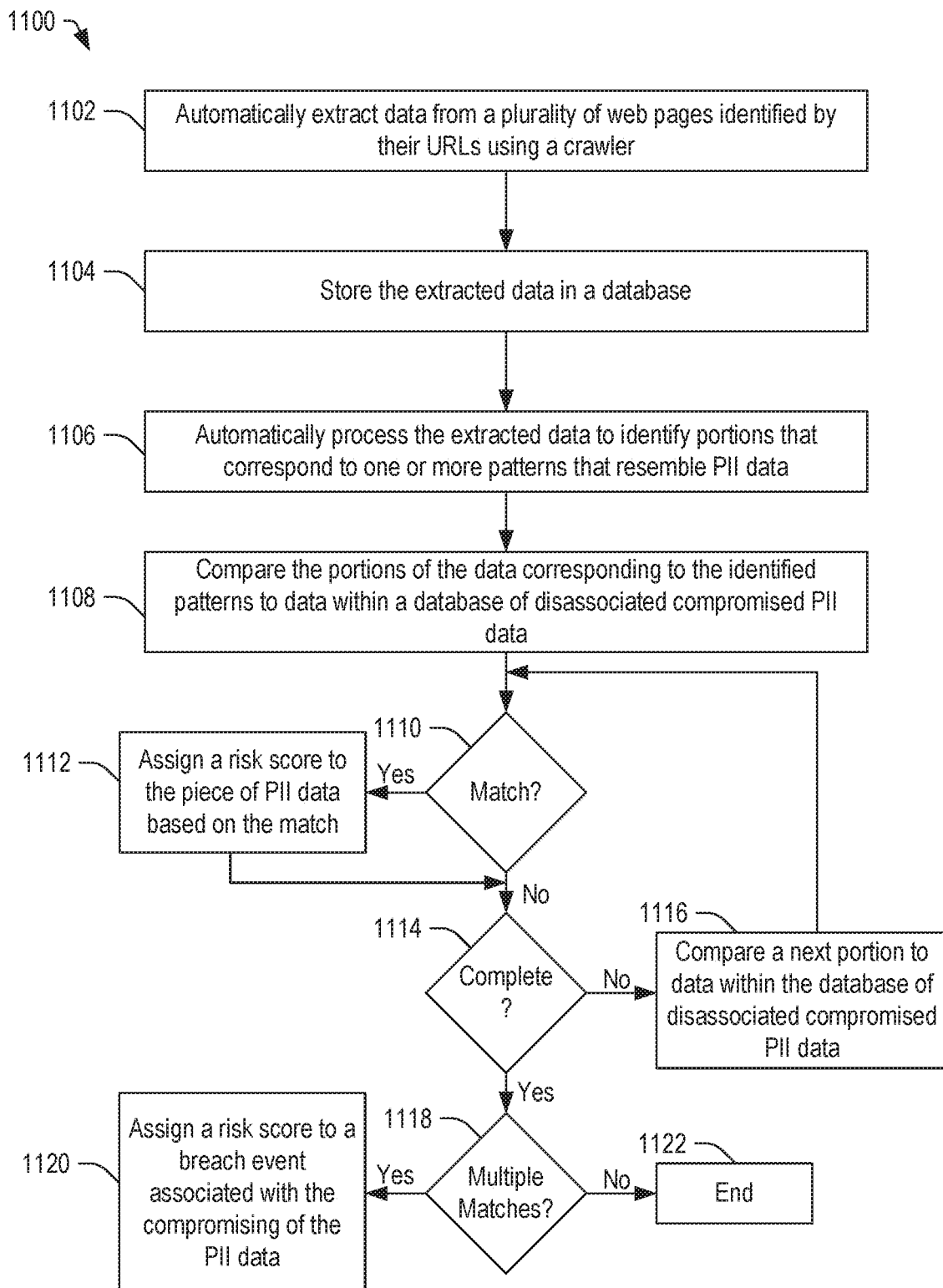
FIG. 11 illustrates a flow diagram of a method of determining a risk score based on a correspondence between compromised data and data retrieved from a web site, in accordance with certain embodiments of the present disclosure.

FIG. 11 illustrates a flow diagram of a method 1100 of determining a risk score based on a correspondence between compromised data and data retrieved from a web site, in accordance with certain embodiments of the present disclosure. The method 1100 may include automatically extracting data from a plurality of web pages identified by their URLs using a crawler. The URLs may be provided by an administrator, stored (and updated with additional URLs) in a list, or both. At 1104, the method 1100 may include storing the extracted data in a database. In some embodiments, the crawler may utilize an indexing and storage application to extract, transform, load, index, and store the data into a database of scraped data.

At 1106, the method 1100 may include automatically processing the extracted data to identify portions that correspond to one or more patterns that resemble PII data.

The patterns may include particular patterns of numbers (e.g., 9-digit numbers, 10-digit numbers, and so on), particular arrangements of letters and punctuation, particular arrangements of letter and numbers, or any combination thereof.

At 1108, the method 1100 can include comparing the portions of the data corresponding to the identified patterns to data within a database of disassociated compromised PII data. At 1110, if there is a match, the method 1100 may include assigning a risk score to the piece of PII data based on the match, at 1112. The risk score may reflect an elevated risk based on the match. The method 1100 may then determine if there are more portions to compare. If, at 1114, the comparison process is not complete, the method 1100 may include comparing a next portion of the disassociated data to data within the database of disassociated compromised PII data, at 1116. The method 1100 returns to 1110 to determine if there is a match.

Returning to 1110, if there is no match, the method 1100 may then determine if there are more portions to compare. If, at 1114, the comparison process is not complete, the method 1100 may include comparing a next portion of the disassociated data to data within the database of disassociated compromised PII data, at 1116. The method 1100 returns to 1110 to determine if there is a match.

Otherwise, at 1114, if there are no more portions, the method 1100 may include determining if multiple matches were identified within the data, at 1118. If not, the method 1100 may terminate, at 1122. Otherwise, if so, the method 1100 may include assigning a risk score to a breach event (or compromise event) associated with the compromising of the PII data. By assigning a risk score to the event, each data item associated with the breach event may be automatically assigned an elevated risk score because multiple PII data items associated with the breach event have been discovered on a website, suggesting that the compromise or exposure event was not benign.

Figure 12:
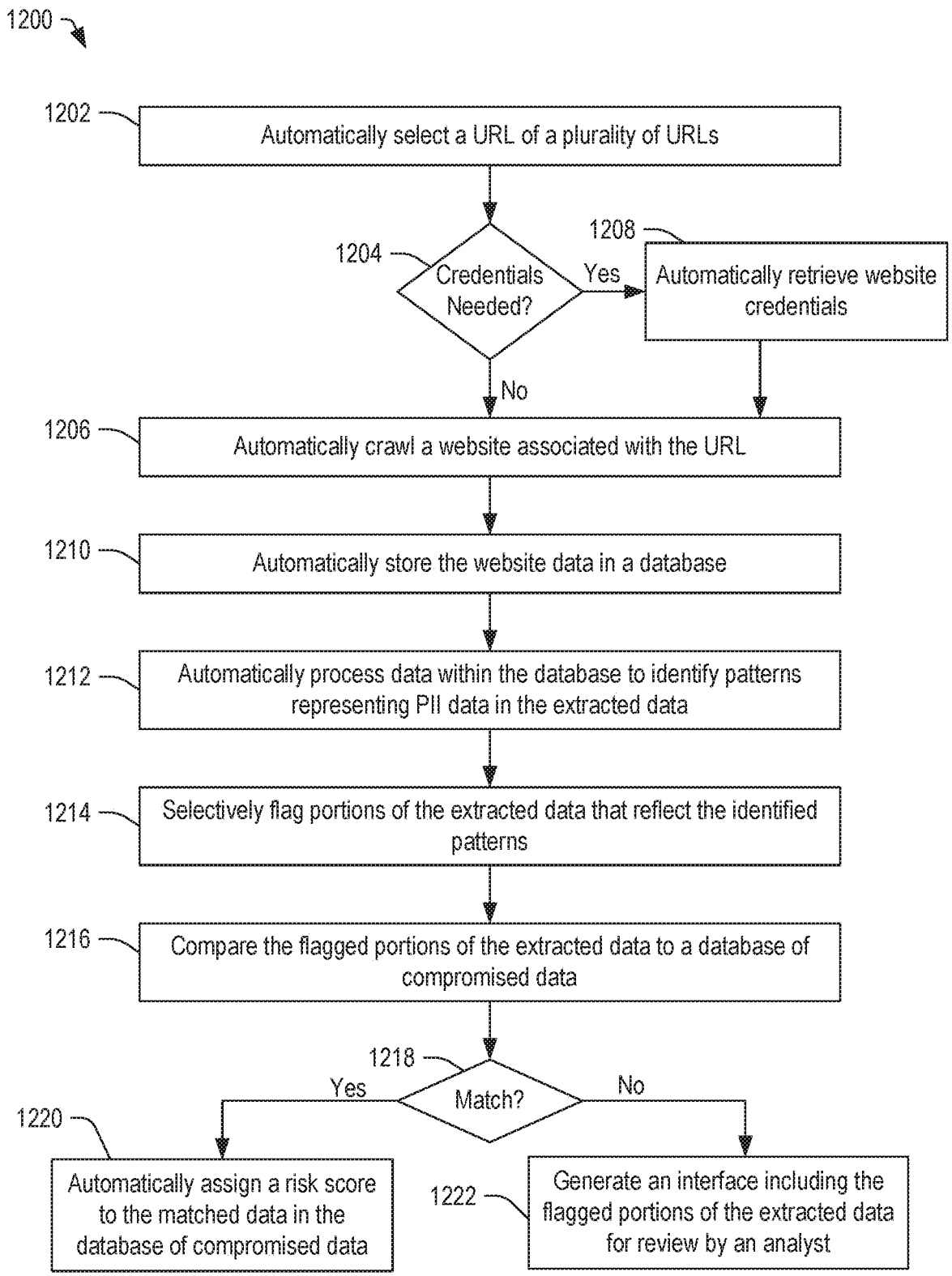
FIG. 12 illustrates a flow diagram of a method of determining a risk score based on a correspondence between compromised data and data retrieved from a web site, in accordance with certain embodiments of the present disclosure.

FIG. 12 illustrates a flow diagram of a method 1200 of determining a risk score based on a correspondence between compromised data and data retrieved from a web site, in accordance with certain embodiments of the present disclosure. At 1202, the method 1200 may include automatically selecting a URL of a plurality of URLs. The plurality of URLs may be stored in a file or database, provided by an administrator, or both (e.g., an initial list provided by an administrator and additional sites added to the list as a result of URLs identified from extracted data). At 1204, if credentials are not needed, the method 1200 may include automatically crawling the website associated with the URL, at 1206. Otherwise, at 1204, if credentials are needed, the method 1200 may include automatically retrieve website credentials and log in, at 1208. As discussed above, the crawler may include multiple spider applications, which may be used in conjunction with a rendering engine to visit and scrape data from web pages.

At 1210, the method 1200 can include automatically storing the website data in a database. In some embodiments, the crawler may provide the scraped data to an indexing and storage module, which may store the data in a database, such as the scraped data 130. At 1212, the method 1200 may include automatically processing the data within the database to identify patterns representing PII data in the extracted data.

At 1214, the method 1200 can include selectively flagging (marking or otherwise isolating) portions of the extracted data that reflect the identified patterns. In some embodiments, flagging the portions may include copying the portions to a temporary table for further processing.

At 1216, the method 1200 can include comparing the flagged portions to data within a database of compromised data. In an example, the flagged portions may be encrypted and compared to encrypted, disassociated compromised PII data within a database to determine if the compromised data has been exposed on a website.

At 1218, if a match is found, the method 1200 may include automatically assigning a risk score to the matched data in the database of compromised data, at 1220. In an example, an existing risk score associated with the matched data may be updated to reflect the new match.

At 1218, if a match is not found, the method 1200 may include generating an interface including the flagged portion of the extracted data for review by an analyst, at 1222. The interface may be presented within an analyst application, within a web browser, or in another way.

In general, the systems, methods, and processes described above with respect to FIGS. 1-12 describe a method of detecting exposure of compromised PII data by looking for data patterns, rather than looking for specific introductory words or terms. As a result, the analytics of the above-described systems can identify exposed PII data even when the data formatting is altered to disguise the content, making this form of detection significantly more robust that conventional systems, which may rely on a particular nomenclature for identifying such exposed data, since the nomenclature can be readily changed to elude detection.

In conjunction with the systems, methods and devices described above with respect to FIGS. 1-12, a compromised PII exchange system may include a risk assessment module configured to scrape data from various websites identified by a list of URLs, identify portions of the scraped data that have patterns that resemble PII data and URL data, and flag those portions for further processing. The risk assessment module may be configured to search a database of disassociated compromised PII data using the portions of the scraped data to determine matches and to update a risk score associated with any matched data within the database to reflect an increased risk based on discovery of that data on a website. In some embodiments, the risk assessment module may be configured to determine a webpage rank of relevance associated with detected PII data and may provide an interface including the PII data to a computing device associated with an administrator. The administrator may interact with the interface to produce a customized heuristic process that may be utilized by the risk assessment module to determine the risk score. Other embodiments are also possible.

As described earlier, in some embodiments, the URL data 132 maintained at the risk assessment module 126 may include both (1) an initial list of URLs compiled by or provided to the operator (or administrator) the system 102 and (2) additional URLs that are detected in data scraped from the websites in the initial list. For example, the initial list may include URLs that have come to the attention of the operator of the system, such as by independent identification of websites that may be offering stolen PII data for sale. The initial websites identified in the initial list of URLs may be accessed and scraped. Additional URLs are identified as a result of the extraction of data from the websites identified in the initial list of URLs. For example, in addition to detecting PII data, the risk assessment module 126 may also detect URLs in the websites identified by the initial list of URLs. Those detected URLs identify other websites (beyond those represented in the initial list of URLs) which may then be subsequently accessed and scraped in order to detect data representing PII (e.g., PII data beyond that detected at the initial websites) as well as URLs for even further websites to be accessed and scraped.

As will be described later in conjunction with FIGS. 13 and 14A-14B, the additional URLs in the URL data 132 (beyond those in an initial list) can be priority ranked according to the website in which the URL data was identified, so that the crawler application 128 scrapes data from the data sources 124 in a prioritized fashion, in order to improve the efficiency of the risk assessment module 126 in searching websites and identifying patterns of data that may represent PII data. Thus, the URL data 132 may identify the initial list of websites to be visited, and after those sites are scraped, identify additional websites to be visited. Data patterns resembling PII data and data representing the URLs for other sites (e.g., where further stolen PII data may be available) are analyzed in order to rank the sites to be visited.

The pattern analytics 134 in the risk assessment module 126 may be used to identify patterns of data representing URLs. Briefly, in one embodiment URLs may be identified by detecting a data pattern that resembles a domain name. For example, a segment or portion of data that includes a word or series of characters followed by a top level domain (e.g., a word or characters followed by a ".com," ".net," or ".onion") can be determined to be a URL that provides a link or address to another website, and that other website can be subsequently accessed for extracting data to find PII data (and also links to even further websites).

FIG. 13 illustrates, and simplified form, a marketplace website 1300 that might exist on the dark web. Such websites may offer stolen PII (as well as other illicit items) for sale and, as seen in FIG. 13, the marketplace website displays samples of PII that may be purchased. Marketplace websites, such as the website illustrated in FIG. 13, may be operated by third parties that offer items for sale from many different parties, and the marketplace website operator may or may not receive a commission for purchases made. Frequently, URLs and links to other websites appear on such a site, for directing the user to either a site where the seller of the PII may be contacted (in order to purchase PII) or directed to yet other marketplace websites similar to the one illustrated in FIG. 13.

FIG. 13 illustrates three different sellers of PII, samples of actual PII that can be purchased, and at least one URL link 1310 to another site. As mentioned above, the links may be to a site where a purchaser can interact with the seller to conduct the transaction, but often the links are to other marketplace sites with the same seller or other sellers offering PII for sale and typically providing the same or different samples of the PII available. As illustrated, these websites may use the term "fullz" to indicate a full or complete set of PII data for an individual. As mentioned earlier, PII data can consist of many different types of personal information relating to an individual, and a fullz represents a more complete and useful set of information that can be used by a fraudster. A fullz will often include, in the case of a US individual and as seen in FIG. 13, a social security number, since a social security number is viewed as highly useful personal identifying information when attempting to conduct fraudulent transactions.

In the simplified website illustrated in FIG. 13, each set of sample PII includes a name, address, date of birth (DOB), drivers license (DL) number, and a Social Security number (SSN), for a person whose PII has been stolen or compromised. It should be appreciated that, in some cases, the samples may be partial and contain less than complete data of each type, but are sufficient for the risk assessment module 126 to identify the entity associated with the sample.

When the website 1300 is accessed by a crawler application (such as the one described earlier in conjunction with FIG. 10), the data at the site (including the sets of PII or fullz) are extracted, stored in a database (such as database 130, FIG. 1), and then processed by the risk assessment module 126 to identify data patterns representing specific sets of PII, such as those illustrated in FIG. 13.

As described earlier, in one embodiment the risk assessment module 126 not only identifies data patterns representing PII data but also data patterns representing URLs, such as the three URLs 1310 illustrated in FIG. 13. Identified PII data is used by the risk assessment module 126 to calculate a risk score relating to compromised PII data, such as described earlier, for example, in conjunction with FIG. 8. Identified URL data is stored within risk assessment module 126 at URL data 132, and is used by the risk assessment module to access further websites, as will be described shortly.

Figure 14A:
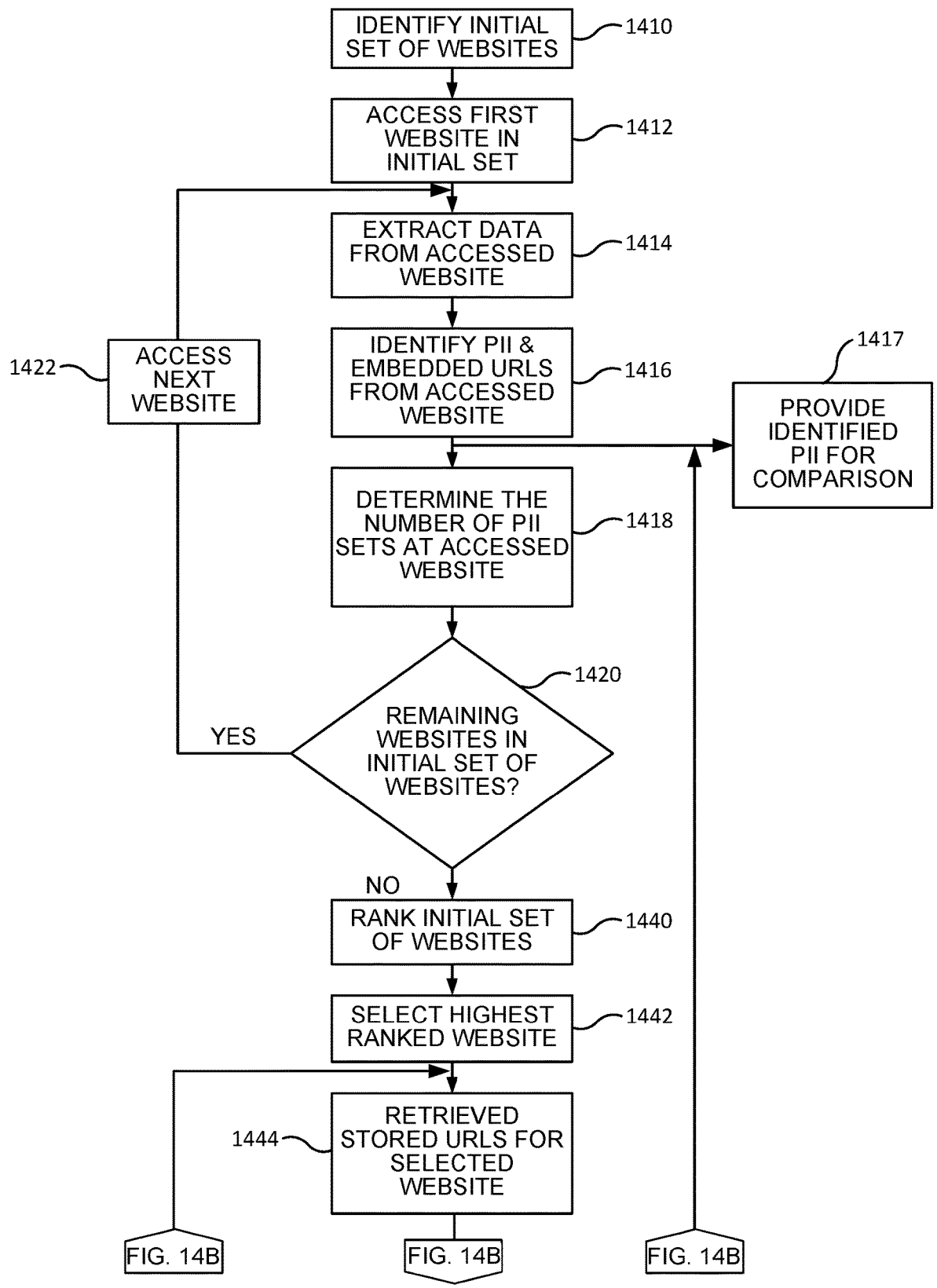
FIGS. 14A and 14B illustrate a flow diagram of a method, in a compromised data exchange system, for detecting both PII data and URL data within extracted data from a website.
Figure 14B:
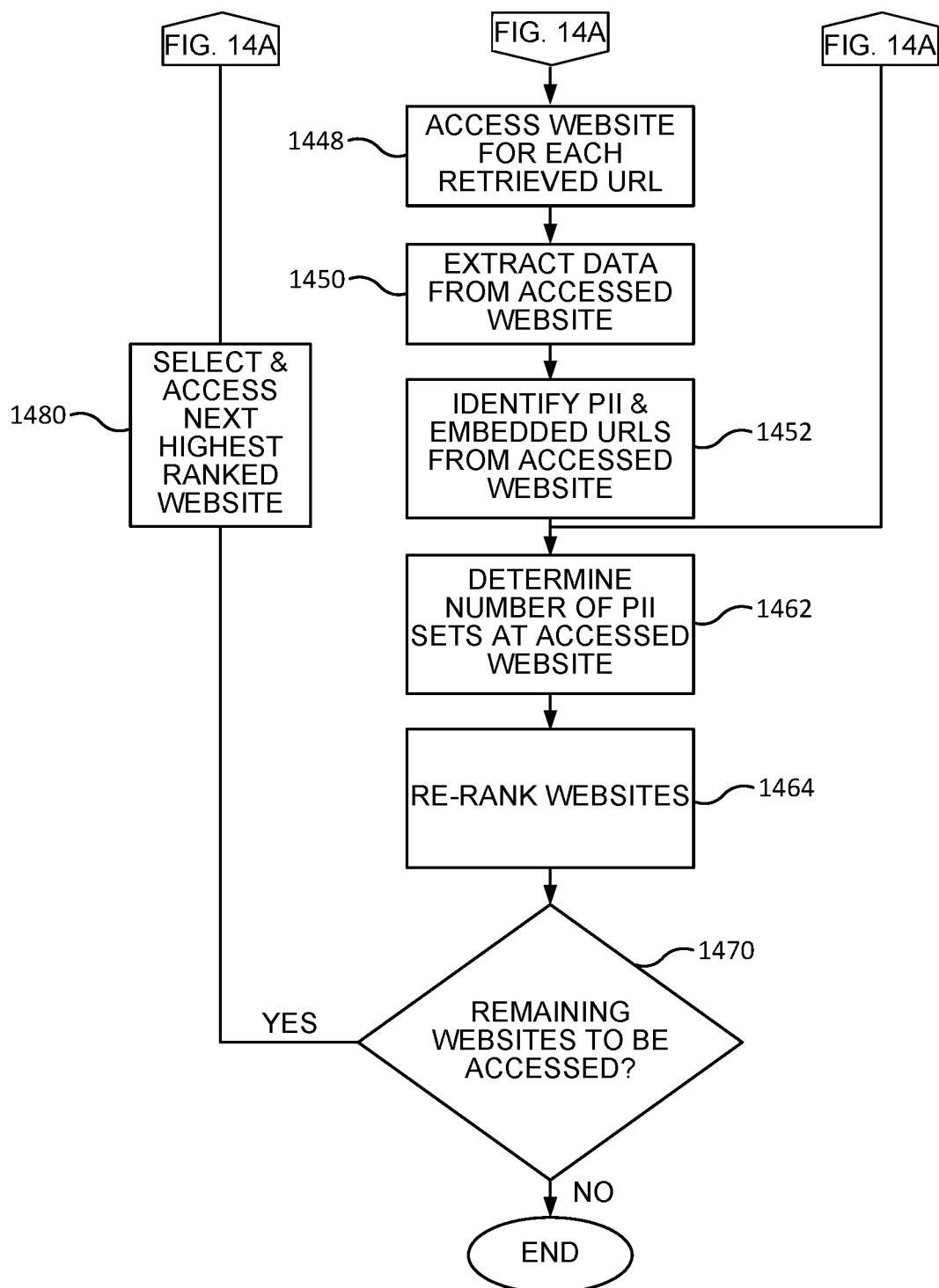

Turning now to FIGS. 14A-14B, the risk assessment module 126 first identifies the initial set or first group of websites that are to be accessed and scraped, step 1410. As described earlier, the initial websites may have been specified or compiled by an operator or administrator and provided to the URL data 132. There may or may not be an order in which the initial websites are accessed, depending, e.g., on the preferences the operator. Normally, all of these sites will be accessed, in some order, since they each have been identified as a site offering stolen PII data for sale. As discussed earlier, and as will be described in greater detail below, in the embodiment now being described there will be other websites identified from scraping the initial set of websites, and because these other websites are likely to be large in number, these other websites will be prioritized for access and scraping.

At step 1412, the first website in the initial set is accessed by the crawler 128 and, at step 1414, data is extracted (and stored in database 130). As described earlier, pattern analytics 134 and PII detector 136 within the risk assessment module 126 analyzes the scraped data to identify PII data at step 1416, and then compared to compromised PII data, step 1417 (in order for the compromised PII data to be scored, e.g., as described earlier in conjunction with FIG. 11). In addition, at step 1416, potential URL data for a second group of websites may be recognized by the pattern analytics 134. As described earlier, recognizing URL data could be accomplished by recognizing domain names at the pattern analytics 134. Since domain names will normally follow a fairly consistent format, the recognition by pattern analytics 134 will often be sufficient. However, the PII detector 136 could also be programmed 138 to process possible URL data there should be any ambiguity or uncertainty, in order to verify or confirm the URL data. Further, an operator or administrator could be alerted to review any identified URL data to confirm that it is valid.

In order to carry out priority ranking of websites as briefly described earlier, for determining the order in which newly identified websites are accessed, the risk assessment module 126 is programmed to determine the number of sets of PII that are identified at each initial website, step 1418. For example, in the illustrated website in FIG. 13, the risk assessment module 126 would determine that there are eleven sets of PII.

In the particular embodiment of the process illustrated in FIG. 14A-14B, the extracted data from each initial website is processed as it is accessed. Thus, at step 1420, the system determines whether all of the initial set of websites have been accessed and if not, the next website in the initial list is accessed at step 1422, and steps 1414-1420 are continued until all of initial set of websites are determined to have been accessed, at step 1420.

However, it should be noted that rather than extracting and processing data from each website as it is accessed, the entire set of initial websites could first be scraped with all the extracted stored at database 130, and then the extracted data from all the websites processed to identify PII data and URL data, and to determine the number of PII sets at each website (steps 1416 and 418).

At step 1440, each of the initial set of websites is ranked in order to provide priority for accessing websites identified by the URLs in each of the initial set of websites. As described earlier, this priority ranking is accomplished by determining the number of separate PII sets at each of the accessed initial websites. An initial website having a higher number of sets of PII will result in all the URLs (and their corresponding websites) identified at that website having the same, higher rank over URLs identified at another site having fewer sets of PII data.

As an example, the website 1300 would be ranked based on the number of sets of PII identified at that website. In FIG. 13, there are eleven sets of PII data illustrated. Thus, a website having more than eleven sets of PII data would receive a higher ranking, and website having less than eleven sets of PII data would receive a lower ranking. It should be appreciated that, in actual practice, many marketplace websites may have considerably more than the eleven sets of PII data illustrated in FIG. 13, and some may have fewer.

The priority ranking of a website may be stored with its associated URL in the URL data 132 of the risk assessment module 126, along with the identified URLs found at that site.

The risk assessment module 126 next begins the accessing the other (second group) websites identified by URLs found in each of the initial set (first group) of websites, based on the priority rank assigned to each of the initial set of websites. At step 1442, the highest ranked website (in the initial set of websites) is selected and the URLs found at that website and stored at URL data 132 are retrieved, step 1444. The new, additional websites represented by the retrieved URLs are then accessed, step 1448, and the data at each of those websites is extracted (and stored at database 130), step 1450. The extracted data has PII data and embedded URL data identified, step 1452 with the identified PII then provided for comparison to compromised PII data, step 1417 (in order for the compromised PII data to be scored, as described earlier in conjunction with FIG. 11).

As was the case with the initial set of websites, each selected website in the second group that is accessed and has extracted data processed (steps 1442-1452), has the number of sets of PII determined at step 1462 in order to rank that selected website. In the particular embodiment seen in FIGS. 14A-14B, websites may be re-ranked at step 1464 based on the determination at step 1462. That is, if a selected site has a number of PII sets (and thus a rank) that is higher than previously ranked websites, that site will be prioritized for being accessed and having data extracted and processed before those lower ranked websites.

At step 1470, the risk assessment module 126 determines whether there are remaining websites to be accessed. If there are remaining websites, the next highest ranked website is accessed at step 1480 and the process returns to step 1444 where the URLs for that next website are retrieved for processing.

It should be appreciated from the foregoing that as a result of the repeating steps in FIGS. 14A-14B (accessing websites, identifying URLs and subsequently accessing websites identified by those URLs), the number of websites to be accessed and have data extracted could become large. For example, as websites (beyond the initial set) are accessed, additional websites are being ranked and added for being accessed, and the process in theory could continue indefinitely. However, the processing of extracted data can be stopped if the amount of identified PII data becomes sufficiently large (to accomplish the scoring of compromised PII data is described in conjunction with FIG. 11). Further, the system can be programmed to stop the processing once the websites fall below a predetermined low ranking. For example, if websites remaining to be accessed (step 1470) all have a relatively low ranking based on a relatively small number of sets of PII data at those websites, the processing can be stopped.

It should also be appreciated that in some cases, a URL found at a website may in fact represent a site where a user might go to purchase stolen PII data (rather than a marketplace website). It may be that such a site would have no displayed samples of PII data, in which case that site would not be ranked for crawling. Further, it may be that such a site may display partial PII data (rather than samples) for selection by a user to purchase the complete PII data associated with the partial data. Embodiments herein could include extracting and analyzing the partial PII data to determine if there are sufficient elements in that partial PII data to match compromised PII data stored at database 122. Also, in some cases, detected URL data may be duplicative (of URL data previously stored for crawling), and such URL data can be removed to prevent redundant crawling of a website.

The processes, machines, and manufactures (and improvements thereof) described herein are particularly useful improvements for companies and systems that utilize PII data. Further, the embodiments and examples herein provide improvements in the technology of data security and computer-based risk assessment systems. In addition, embodiments and examples herein provide improvements to the functioning of a computer by providing a secure PII exchange system that allows at-risk companies and consumers to determine the risk associated with particular PII data, thereby creating a specific purpose computer by adding such technology. Further, embodiments and examples herein provide improvements to the functioning of a computer by crawling web pages based on their URLs to identify patterns of data that resemble PII data in order to compare those portions of the data to compromised data in order to further evaluate a risk associated with relying on such data. Further, embodiments and examples provided herein provide improvements to the functioning and efficiency of a computer when crawling large numbers of webpages to identify patterns of data that resemble PII data, by prioritizing the webpages to be accessed based on rankings associated with those webpages.

Thus, the improvements herein provide for technical advantages, such as providing a system through which a compromised company (a company that has exposed PII data either inadvertently or through a hack or other data breach event) may share access to its exposed data in a form that cannot be misappropriated. Further, the improvements herein provide for technical advantages in that other companies may utilize such data as well as the risk determinations based on potential discovery of such data on the Internet to make their own assessments of risk for extending credit, authorizing account access, and so on. For example, the systems and processes described herein can be particularly useful to any company offering services (including financial services) or that maintains customer information, including those that maintain customer accounts that could be compromised based on data acquired from a data exposure event. Further, the improvements herein provide additional technical advantages, such as providing a system in which the PII data is disassociated, and each field of the PII data is separately encrypted using a different encryption key, providing a secure data store of unlinked data elements such that a single PII data record cannot be re-assembled from the disassociated data. Further, the encrypted and disassociated data can be searched using similarly encrypted and disassociated data to identify potential matches, which matches may indicate a possible risk due to the exposure of the data. Further, the efficiency achieved in accessing websites to extract data (using priority rankings) provides further technical advantages. While technical fields, descriptions, improvements, and advantages are discussed herein, these are not exhaustive and the embodiments and examples provided herein can apply to other technical fields, can provide further technical advantages, can provide for improvements to other technologies, and can provide other benefits to technology. Further, each of the embodiments and examples may include any one or more improvements, benefits and advantages presented herein.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, in the flow diagrams presented herein, in certain embodiments, blocks may be removed or combined without departing from the scope of the disclosure. Further, structural and functional elements within the diagram may be combined, in certain embodiments, without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A compromised data exchange system, comprising:
an interface configured to couple to a network;
a processor coupled to the interface; and
a database storing compromised personally identifying information (PII) data;
a memory accessible to the processor and storing instructions that, when executed, cause the processor to:
extract data from one or more specified websites using a crawler;
detect portions within the extracted data from the specified websites that resemble one or more sets of PII data, each set of PII data associated with a compromised entity;
detect URLs within the extracted data from the specified websites that identify one or more other websites;
determine a priority ranking for each of the other websites based on a number of sets of PII data at each of the identified websites;
extract data from the other websites, wherein each of the other websites are accessed to extract data based on its determined priority ranking;
detect portions within the extracted data from the other web sites that resemble one or more sets of PII data;
compare (1) the detected portions within the extracted data, from both the specified web sites and the other websites, that resemble one or more sets of PII data, and (2) the compromised PII data stored at the database, to determine a match using a risk assessment module; and
selectively assign a risk score to a data item within the database of compromised PII data, in response to determining the match.

2. The system of claim 1, further comprising a risk assessment module and a risk scoring module, and wherein the processor:
detects portions within the extracted data, from both the specified websites and the other websites, that resemble one or more sets of PII data by using the risk assessment module and based on PII patterns;
compares (1) the detected portions within the extracted data, from both the specified websites and the other websites, that resemble one or more sets of PII data and (2) the compromised PII data stored at the database, to determine a match, by using the risk assessment module; and
assigns a risk score to a data item of the compromised PII data stored at the database, in response to determining a match, by using the risk scoring module.

3. The system of claim 1, wherein the compromised PII data stored at the database comprises disassociated compromised PII, including PII data that are disassociated from one another such that PII data of a particular individual cannot be reassembled from the data in the database.

4. The system of claim 1, wherein the priority ranking is determined by counting a number of sets of PII data at each one of the specified websites.

5. The system of claim 4, wherein the number of sets of PII data at a first one of the specified websites establishes the priority ranking for the other websites represented by URLs detected at the first one of the specified websites, such that the other websites represented by URLs detected at the first one of the specified website are accessed before other websites represented by URLs detected at specified websites having a lower number of sets of PII data.

6. The system of claim 4, wherein the same determined priority ranking is assigned to each of the other websites represented by URLs detected within extracted data from one of the specified websites, based on the number of sets of PII data counted at the one of the specified websites.

7. The system of claim 1, wherein the instructions that cause the processor to detect portions within the extracted data that resembles one or more sets of PII data, further include instructions that, when executed, cause the processor to:
process the extracted data to identify portions that include patterns of numbers resembling at least one of a social security number, a phone number, a birth date, a driver's license number, and an account number; and
flag the identified portions for further processing.

8. The system of claim 1, wherein the instructions that cause the processor to detect URLs within the extracted data from the specified websites further include instructions that, when executed, cause the processor to:
process the extracted data to identify patterns of characters resembling a domain name.

9. The system of claim 1, wherein the instructions that cause the processor to detect portions within the extracted data that resembles one or more sets of PII data further include instructions that, when executed, cause the processor to:
encrypt each of the detected portions according to an encryption applied to data within the database; and
compare each of the encrypted portions to compromised data within the database to determine the match.

10. The system of claim 9, wherein the instructions that cause the processor to selectively assign the risk score include instructions that, when executed, cause the processor to increase a risk score for a piece of disassociated data within the database in response to determining the match.

11. The compromised data exchange system of claim 1, wherein the compromised PII data stored at the database comprises disassociated compromised PII, including PII data that are disassociated from one another such that PII data of a particular individual cannot be reassembled from the data in the database, and wherein the instructions that cause the processor to selectively assign the risk score include instructions that, when executed, cause the processor to assign a risk score to each piece of disassociated data within the database associated with a particular data breach event in response to determining multiple matches between the detected portions and the disassociated data.

12. A compromised data exchange system, comprising:
an interface configured to couple to a network;
a processor coupled to the interface; and
a database storing disassociated compromised personally identifying information (PII) data, including items of PII data that are disassociated from one another such that PII data of a particular individual cannot be reassembled from the data in the database;
a memory accessible to the processor and storing instructions that, when executed, cause the processor to:
extract data from one or more first websites on the dark web using a crawler;
detect portions within the extracted data from the first websites that resemble one or more sets of PII data, each set of PII data associated with a compromised entity;
detect URLs within the extracted data from the first websites that identify one or more second websites;
determine a priority ranking for each of the second websites based on a number of sets of PII data at each of the first websites;
extract data from the second websites, wherein each of the second websites are accessed to extract data based on its determined priority ranking;
detect portions within the extracted data from the second websites that resemble one or more sets of PII data;
compare (1) the detected portions that resemble one or more sets of PII data from the first websites and from the second websites and (2) the disassociated compromised PII data stored at the database, to determine a match using a risk assessment module; and
selectively assign a risk score to a data item within the database of compromised PII data, in response to determining the match.

13. A method for evaluating compromised personally identifying information (PII) data, comprising:
storing compromised personally identifying information (PII) data at a database;
extracting data from one or more specified websites using a crawler;
detecting portions within the extracted data from the specified websites that resemble one or more sets of PII data, each set of PII data associated with a compromised entity;
detecting URLs within the extracted data from the specified websites that identify one or more other websites;
determine a priority ranking for each of the other websites based on a number of sets of PII data at each of the specified websites;
extracting data from the other websites, wherein each of the other websites are accessed to extract data based on its determined priority ranking;
detecting portions within the extracted data from the other websites that resemble one or more sets of PII data;
comparing (1) the detected portions that resemble one or more sets of PII data from the specified websites and from the other websites and (2) the compromised PII data stored at the database, to determine a match using a risk assessment module; and
selectively assigning a risk score to a data item within the database of compromised PII data, in response to determining the match.

14. The method of claim 13, further comprising:
detecting portions within the extracted data that resemble one or more sets of PII data, by using a risk assessment module and based on PII patterns,
comparing (1) the detected portions that resemble one or more sets of PII data from the specified websites and from the other websites and (2) the compromised PII data stored at the database, to determine a match, by using the risk assessment module; and
assigning a risk score to a data item of the compromised PII data stored at the database, in response to determining a match, by using a risk scoring module.

15. The method of claim 13, wherein the compromised PII data stored at the database comprises disassociated compromised PII, including PII data that are disassociated from one another such that PII data of a particular individual cannot be reassembled from the data in the database.

16. The method of claim 13, wherein the priority ranking is determined by counting the number of sets of PII data at each one of the specified websites.

17. The method of claim 16, wherein the number of sets of PII data at a first one of the specified websites establishes the priority ranking for the other websites represented by URLs detected at the first one of the specified websites, such that the other websites represented by URLs detected at the first one of the specified website are accessed before other websites represented by URLs detected at specified websites having a lower number of sets of PII data.

18. The method of claim 16, wherein the same determined priority ranking is assigned to each of the other websites represented by URLs detected within extracted data from one of the specified websites, based on the number of sets of PII data counted at the one of the specified websites.

19. The method of claim 13, wherein detecting portions within the extracted data that resemble one or more sets of PII data further comprises instructions:
processing the extracted data to identify portions that include patterns of numbers resembling at least one of a social security number, a phone number, a birth date, a driver's license number, and an account number; and
flagging the identified portions for further processing.

20. The method of claim 13, wherein detecting URLs within the extracted data from the specified websites further comprises:
processing the extracted data to identify patterns of characters resembling a domain name.

* * * * *